(12) United States Patent
Chino et al.

(10) Patent No.: US 7,623,160 B2
(45) Date of Patent: Nov. 24, 2009

(54) IMAGE PROCESSING METHOD, IMAGE PROCESSING PROGRAM, IMAGE PROCESSING APPARATUS, IMAGING APPARATUS, IMAGING METHOD, AND IMAGING PROGRAM

(75) Inventors: Noriko Chino, Kanagawa (JP); Kuniko Suzuki, Kanagawa (JP); Katsumi Yamamoto, Kanagawa (JP)

(73) Assignee: Sony Corporation (JP)

( * ) Notice: Subject to any disclaimer, the term of this patent is extended or adjusted under 35 U.S.C. 154(b) by 411 days.

(21) Appl. No.: 11/516,361

(22) Filed: Sep. 6, 2006

(65) Prior Publication Data

US 2007/0126887 A1    Jun. 7, 2007

(30) Foreign Application Priority Data

Sep. 6, 2005   (JP)   ............................ P2005-258424

(51) Int. Cl.
*H04N 9/73*   (2006.01)
*G06K 9/00*   (2006.01)

(52) U.S. Cl. .............. 348/223.1; 348/224.1; 348/225.1; 382/162; 382/167

(58) Field of Classification Search .............. 348/223.1, 348/224.1, 225.1, 325.1; 382/162, 167, 274
See application file for complete search history.

(56) References Cited

U.S. PATENT DOCUMENTS

| | | | | |
|---|---|---|---|---|
| 4,954,884 A | * | 9/1990 | Nakayama et al. | 348/225.1 |
| 5,099,316 A | * | 3/1992 | Ogawa | 348/228.1 |
| 5,283,635 A | * | 2/1994 | Suzuki et al. | 358/516 |
| 5,485,284 A | * | 1/1996 | Shono et al. | 358/504 |
| 7,081,920 B2 | * | 7/2006 | Sugiki | 348/223.1 |
| 7,239,315 B2 | * | 7/2007 | Kim et al. | 345/426 |
| 7,286,703 B2 | * | 10/2007 | Kaku | 382/167 |
| 7,417,671 B2 | * | 8/2008 | Sugimori | 348/223.1 |
| 2008/0151071 A1 | * | 6/2008 | Takayama | 348/223.1 |
| 2008/0158381 A1 | * | 7/2008 | Chang | 348/223.1 |

FOREIGN PATENT DOCUMENTS

| | | |
|---|---|---|
| JP | 63-237681 A | 10/1988 |
| JP | 1-231586 A | 9/1989 |
| JP | 2-153693 A | 6/1990 |
| JP | 3-255796 A | 11/1991 |
| JP | 2005-130317 A | 5/2005 |
| JP | 2005-175975 A | 6/2005 |

* cited by examiner

*Primary Examiner*—Lin Ye
*Assistant Examiner*—Marly Camargo
(74) *Attorney, Agent, or Firm*—Lerner, David, Littenberg, Krumholz & Mentlik, LLP

(57) ABSTRACT

An image processing method includes changing white balance in a color temperature direction by using values such that each of first and second color signals is converted into a logarithm.

4 Claims, 21 Drawing Sheets

1

IMAGE PROCESSING METHOD, IMAGE PROCESSING PROGRAM, IMAGE PROCESSING APPARATUS, IMAGING APPARATUS, IMAGING METHOD, AND IMAGING PROGRAM

CROSS-REFERENCE TO RELATED APPLICATIONS

The present application claims priority from Japanese Patent Application No. JP 2005-258424 filed on Sep. 6, 2005, the disclosure which is hereby incorporated by reference herein.

BACKGROUND OF THE INVENTION

1. Field of the Invention

The present invention relates to an image processing method capable of correcting and changing white balance output, an image processing program, an image processing apparatus, an imaging apparatus, an imaging method, and an imaging program.

2. Description of the Related Art

In the related art, in imaging apparatuses (video cameras, digital cameras, or the like) for electrically obtaining an imaging signal, processing called white balance has typically been performed so that the color of an image becomes more natural. The white balance processing is processing for adjusting balance of R (red color), G (green color), and B (blue color) components of image data so that the color of a white object photographed under a light source at a certain color temperature is photographed as a white color without color imbalance.

White balance will now be described briefly. First, color temperature will be described. Color temperature is the color of radiation light emitted from a complete black body when the complete black body is heated, and the color and the temperature are defined by the relationship of 1:1. The temperature at which a complete black body emits radiation light of a particular color is termed color temperature and is measured in units of "K" (Kelvin), which is the unit of thermodynamic temperature. The chromaticity of the color of the radiation light from a complete black body changes from red to white, and further to blue as the temperature of the complete black body increases. For this reason, a screen with strong overall redness can be expressed as "having a low color temperature", and a screen with strong overall blueness can be expressed as "having a high color temperature". The color temperature of a typical light source is, for example, approximately 2800K with a 60 W tungsten incandescent lamp, approximately 5600K with daylight sunlight, and approximately 6500K with a fluorescent lamp of daytime color.

FIG. 20 shows changes in color temperature due to black body radiation as the relationship between red color (R) and blue color (B), which is based on green color (G). In FIG. 20, the vertical axis indicates R, and the horizontal axis indicates B. Color temperature decreases toward the left side along the curve, and color temperature increases toward the right side. Changes in the color temperature shown in FIG. 20 are hereinafter referred to as blackbody radiation. As described above, the blackbody radiation forms a curve of a non-linear complex shape.

In actual white balance processing, it is common practice that one color (for example, G) among the components of R, G and B is fixed, and the other two colors (for example, R and B) can be changed along the blackbody radiation, thereby relative adjustment of the balance of each color of R, G, and B is realized. In Japanese Unexamined Patent Application Publication No. 2005-130317, a technology in which natural color reproduction is realized by performing appropriate white balance adjustment when an infrared cut filter is used.

As described above, since the blackbody radiation forms a non-linear complex curve, the relationship between R and B and the relationship between color temperature and R and B becomes nonlinear. As a consequence, a problem arises in that computations performed when white balance output is corrected and changed become very complex.

A case is considered in which a user specifies that color temperature is corrected in a state in which white balance is achieved in a predetermined light source environment. For example, first, the levels of an R signal and a B signal in a state in which white balance is currently achieved are obtained. Next, the color temperature after correction is determined with the amount of correction specified by the user, and the levels of the R signal and the B signal corresponding to the color temperature are calculated. Then, the amount of correction of the gains of the R signal and the B signal is determined on the basis of the R signal and the B signal in a state in which white balance is achieved and on the basis of the R signal and the B signal after correction by the user.

In such a case, for example, a computation when each of the levels of the R signal and the B signal is determined from the specified color temperature is performed on the basis of the blackbody radiation. Furthermore, a computation is performed for checking whether or not the R signal and the B signal when white balance is achieved in the current light source environment lies along the blackbody radiation. Also, when the R signal and the B signal do not lie on the blackbody radiation, a predetermined correction computation is performed on the basis of blackbody radiation.

As described above, in processes for correcting and changing white balance output, various computations are performed on the basis of the nonlinear blackbody radiation. In particular, in a portable video camera and digital camera, since it is considered that it is difficult to install a CPU (Central Processing Unit) capable of high-speed computation, there is a risk that processing can take a long time.

In order to easily perform computations for correcting and changing white balance output, as an example is shown in FIG. 21, a method for approximating blackbody radiation with a plurality of linear straight lines may also be used. In the example of FIG. 21, the blackbody radiation (indicated by the dotted line) are approximated with three linear straight lines $S_1$, $S_2$, and $S_3$. Since each of the linear straight lines $S_1$, $S_2$, and $S_3$ can be expressed by a simple first-order equation, the computation can be performed easily and at a high speed.

However, even in this method, there is a problem in that a large deviation occurs with blackbody radiation at a connection point between two straight lines, and a correction calculation needs to be performed in the connection portion. Another problem is how the correction calculation is performed.

Furthermore, even in the method for approximating the blackbody radiation with a straight line, it is difficult to avoid the relationship between an R signal and color temperature and the relationship between a B signal and color temperature from becoming nonlinear as a whole. Therefore, some way of counteracting this trend becomes necessary, for example, the relationship between the B signal and color temperatures is formed as a table and stored in a memory in advance, or computations are performed at several divided blocks corresponding to the levels of the B signals, and it is difficult to avoid the computations from becoming complex. Furthermore, it is also a problem that, how case separations are performed on color temperature and how block divisions are performed.

Accordingly, it is preferable to provide an image processing method capable of easily correcting and changing white balance output values, an image processing program, an image processing apparatus, an imaging apparatus, an imaging method, and an imaging program.

SUMMARY OF THE INVENTION

According to an embodiment of the present invention, there is provided an image processing method including changing white balance in a color temperature direction by using values such that each of first and second color signals is converted into a logarithm.

According to another embodiment of the present invention, there is provided an image processing program for enabling a computer apparatus to perform an image processing method, the method including changing white balance in a color temperature direction by using values such that each of first and second color signals is converted into a logarithm.

According to another embodiment of the present invention, there is provided an image processing apparatus in which white balance is changed in a color temperature direction by using values such that each of first and second color signals is converted into a logarithm.

According to another embodiment of the present invention, there is provided an imaging apparatus including an imaging section configured to capture light from a subject and output an image signal; a white balance adjustment section configured to adjust white balance based on the image signal output from the imaging section; a color temperature change instruction section configured to provide instructions for changing the adjusted white balance in a color temperature direction; and a color temperature change section configured to change, in response to instructions from the color temperature change instruction section, the white balance in the color temperature direction, by using values such that each of first and second color signals, which are based on the image signal output from the imaging section, is converted into a logarithm.

According to another embodiment of the present invention, there is provided an imaging method including changing white balance in a color temperature direction in response to instructions for changing the white balance adjusted based on an image signal output from an imaging section in the color temperature direction by using values such that each of first and second color signals based on the image signal output from the imaging section is converted into a logarithm.

According to another embodiment of the present invention, there is provided an imaging program for enabling a computer apparatus to perform an imaging method, the imaging method including changing white balance in a color temperature direction in response to instructions for changing the white balance adjusted based on an image signal output from an imaging section in the color temperature direction by using values such that each of first and second color signals based on the image signal output from the imaging section is converted into a logarithm.

In the embodiments of the present invention, the changing of the white balance along the color temperature direction is performed by using values such that each of the first and second color signals is converted into a logarithm. Therefore, the process for changing the white balance in the color temperature direction can be performed by only performing calculations of a simple first-order equation by means of a program.

Furthermore, in the embodiments of the present invention, the changing of the white balance along the color temperature direction is performed by using values such that each of first and second color signals based on an image signal output from an imaging section is converted into a logarithm in response to instructions for changing the white balance adjusted based on the image signal output from the imaging section. Therefore, the process for changing the white balance in the color temperature direction can be performed by only performing calculations of a simple first-order equation by means of a program, and thus processing can be performed at a high speed and the imaging time can be shortened.

DETAILED DESCRIPTION

Embodiments of the present invention will now be described below with reference to the drawings. In an embodiment of the present invention, white balance output is corrected and changed by using values such that an R signal and a B signal are converted on a logarithmic plane. Blackbody radiation on a B/G-R/G plane can be represented by a straight line, and correction in the color temperature direction and in the chromaticity deviation direction can easily be performed without referring to a table or without performing complex calculations.

Figure 1:
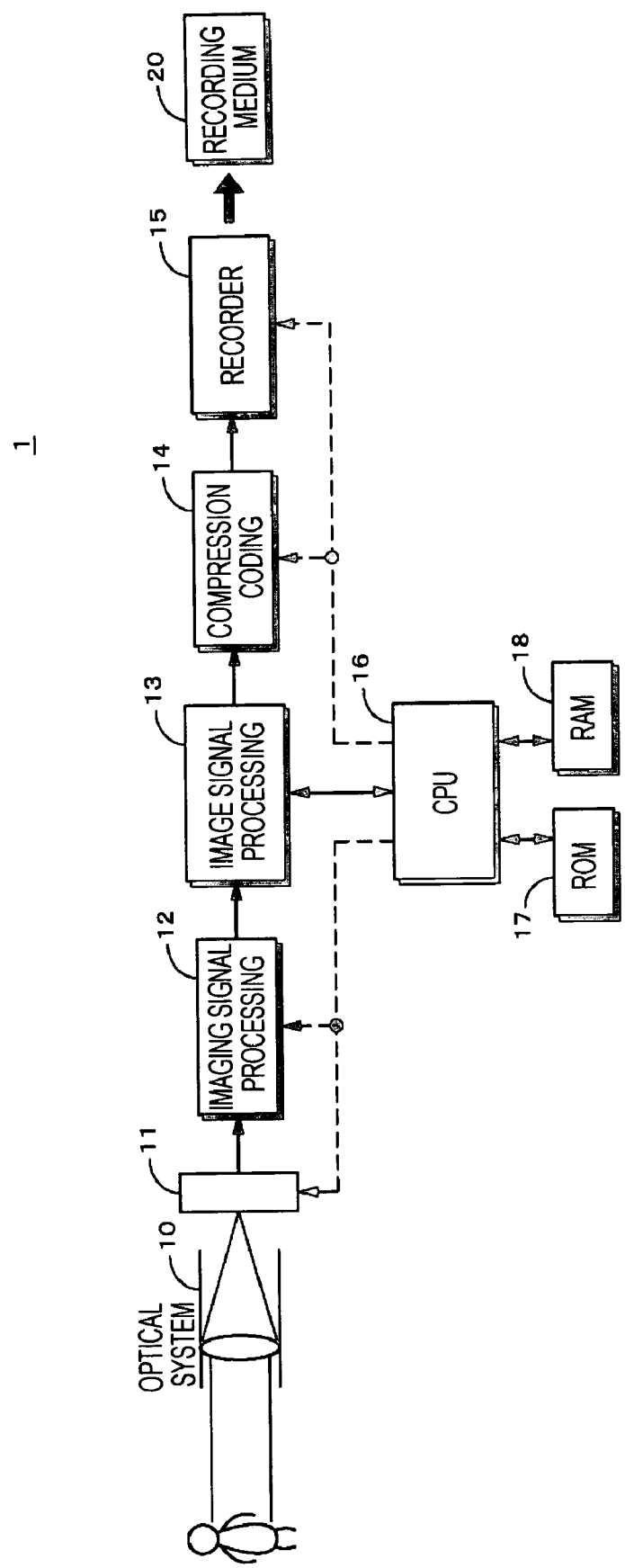
FIG. 1 is a block diagram showing an example of the configuration of an imaging apparatus 1 according to an embodiment of the present invention.

FIG. 1 shows an example of the configuration of an imaging apparatus 1 according to an embodiment of the present invention. An optical system 10 includes a lens, an aperture mechanism, a focus mechanism, and a zoom mechanism. The aperture mechanism, the focus mechanism, and the zoom mechanism are driven by a driving section (not shown) under the control of a CPU 16 (to be described later), so that aperture, focus, zoom/wide, and the like are adjusted.

An imaging device 11 is formed of, for example, an imaging device such as a CCD (Charge Coupled Device), photoelectrically converts irradiated light into an electrical signal, and outputs it as an imaging signal. An imaging signal processor 12 performs predetermined signal processing on the imaging signal output from the imaging device 11 so that the signal is converted into a digital signal and is output. For example, the imaging signal processing circuit 12 samples only a signal having image information by means of a CDS (Correlated Double Sampling) circuit from among the imaging signals output from the imaging device 11, and also removes noise and adjusts gain by means of an AGC (Auto Gain Control) circuit. Then, the signal is converted into a digital signal through A/D conversion and is output.

An image signal processor 13 performs signal processing for a detection system on the digital signal supplied from the imaging signal processor 12 and extracts image data of each color of R, G, and B (hereinafter referred to as an "R signal", a "G signal", and a "B signal", respectively) . The image signal processor 13 performs image-quality adjustment, such as gamma (γ)correction and white balance adjustment, on the R signal, the G signal, and the B signal, and also performs processing, such as hue correction and sharpness correction, on the signals.

In the image signal processor 13, white balance output can be corrected and changed. In an embodiment of the present invention, correction and changing of the white balance output are performed on the basis of the values such that the R signal and the B signal are converted on a logarithmic plane.

A compression-coding section 14 performs a compression-coding process on image data supplied from the image signal processor 13 by using a predetermined method. When the image data is a still image, a compression-coding process is performed by using, for example, the JPEG (Joint Photographic Experts Group) method. In the case of a still image, the compression-coding process can be omitted. When the image data is a moving image, a compression-coding method, such as MPEG2 (Moving Pictures Experts Group 2) and MPEG4, can be used. The method for compression-coding image data is not limited to these examples.

The compression-coded image data is supplied to a recording section 15, whereby the image data is recorded on a recording medium 20. Examples of usable media include a non-volatile semiconductor memory and an optical disc. When a moving image is to be recorded, a magnetic tape can also be used for the recording medium 20.

A ROM (Read Only Memory) 17 and a RAM (Random Access Memory) 18 are connected to the CPU (Central Processing Unit) 16. The CPU 16 controls the entire imaging apparatus 1 in accordance with programs and data prestored in the ROM 17 by using the RAM 18 as a work memory.

For example, the CPU 16 obtains an R signal, a G signal, and a B signal from the image signal processor 13, Then, on the basis of each of the obtained signals, the CPU 16 calculates, in accordance with a program, amplifier gains with respect to the R signal and the B signal, which are used for adjusting white balance. The calculated amplifier gains are supplied to the image signal processor 13. On the basis of the supplied amplifier gains, the image signal processor 13 adjusts each gain of the R signal and the B signal and adjusts the white balance of the image data.

Figure 2:
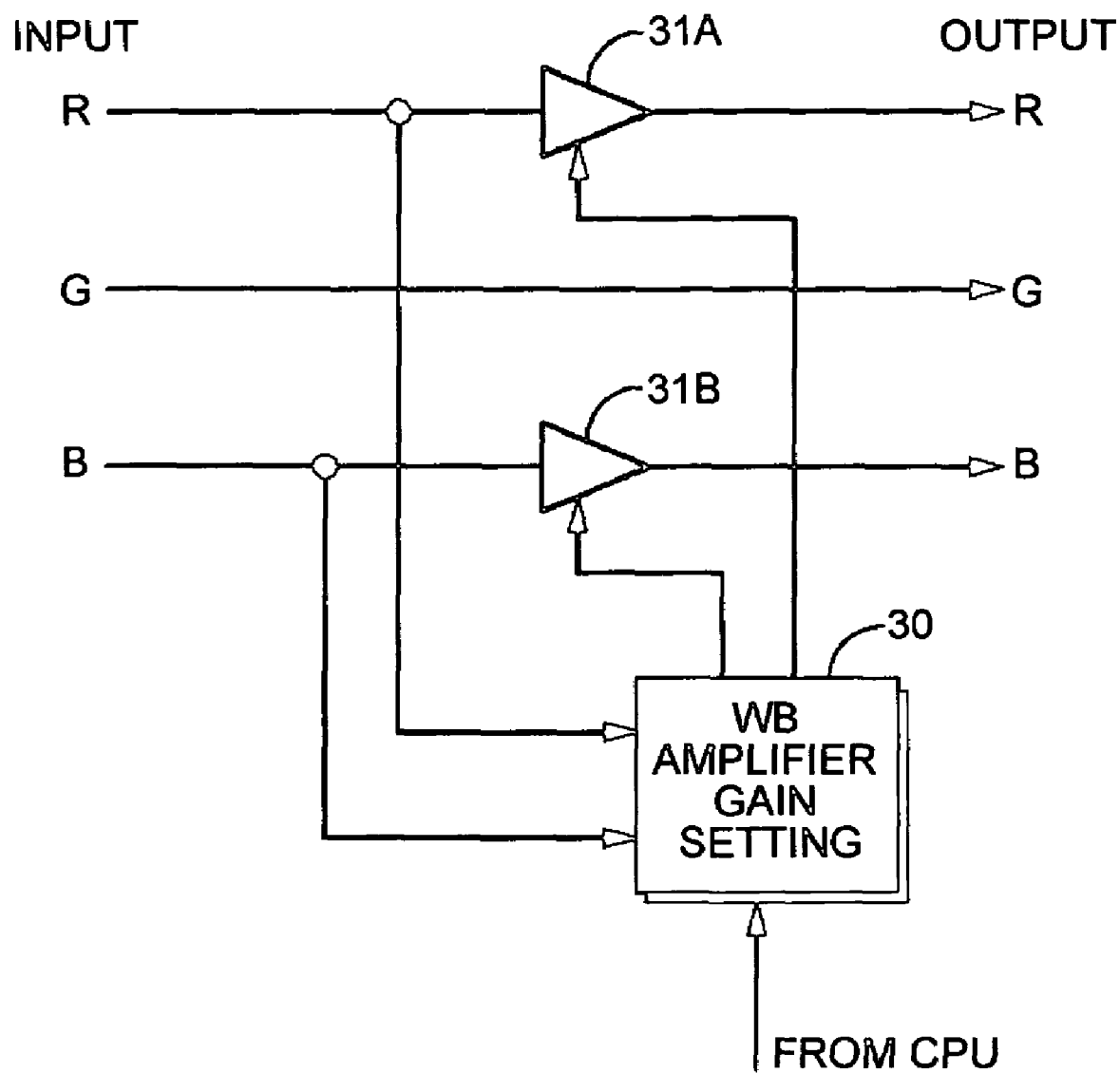
FIG. 2 is a block diagram showing an example of the configuration for adjusting white balance.

FIG. 2 shows an example of the configuration for adjusting white balance in the image signal processor 13. The input R signal and the B signal are supplied to an amplifier 31A and an amplifier 31B, respectively, and are also supplied to a WB (white balance) amplifier gain setting section 30. On the basis of a control signal from the CPU 16, the WB amplifier gain setting section 30 sets each gain of the amplifiers 31A and 31B.

For example, the WB amplifier gain setting section 30 integrates each of the R signal, the G signal, and the B signal for one frame. The integrated results are supplied to the CPU 16. The CPU 16 compares the integrated results of the R signal, the G signal, and the B signal. On the basis of the comparison result, the CPU 16 outputs a control signal for setting the gains of the amplifier 31A and the amplifier 31B so that the levels of the R signal, the G signal, and the B signal become equal with one another. This control signal is supplied to the WB amplifier gain setting section 30. On the basis of the supplied control signal, the WB amplifier gain setting section 30 sets the gains of the amplifier 31A and the amplifier 31B. White balance is achieved as a result of the following: by adjusting each of the gains of the amplifier 31A and the amplifier 31B, the levels of the R and B signals are relatively changed with respect to the G signal, and the levels of the R, G and B signals are made equal.

An amplifier may further be provided for the G signal so that the gain is adjusted for each of the R signal, the G signal, and the B signal.

Next, a method for correcting and changing white balance output according to an embodiment of the present invention will be described in more detail. In an embodiment of the present invention, when preset white balance output is corrected in the color temperature direction or in the chromaticity deviation direction for some factors, calculations are performed on the logarithmic plane of the R signal and on the logarithmic plane of the B signal, which are based on the G signal. The blackbody radiation draws a curve of a nonlinear complex shape, as has already been described in the related art. The inventors of the present invention derived that the blackbody radiation can be approximated to a linear straight line by performing calculations on the logarithmic planes of the R signal and the B signal, and by using this fact, calculations in the color temperature direction are made very simple.

Examples of the above-described some factors for correcting preset white balance include a case in which white balance output is intentionally changed as the specification of the imaging apparatus 1 so that the output image is changed. Furthermore, there are cases in which, for example, the user specifies the amount of correction of white balance and color temperature with respect to the imaging apparatus 1, and white balance output in accordance with the specified amount of correction and color temperature is performed.

A description will now be given of the fact that blackbody radiation can be handled as a linear straight line on the logarithmic planes of the R signal and the B signal.

In general, a line connecting chromaticity points of radiation at the absolute temperature of a black body is called a blackbody locus or blackbody radiation, and a curve approximating chromaticity coordinates plotted on an xy chromaticity diagram on the basis of daylight measurement results by the CIE (commission internationale de l'eclairage) is called a daylight locus. The blackbody locus and the daylight locus can be regarded as substantially the same. An equation for obtaining values of color temperature at equal intervals and for determining a daylight locus in the xy chromaticity diagram becomes the following equation (1). $T_{cp}$ is the color temperature. Here, on the basis of equation (1), the coordinates on the xy chromaticity diagram of the daylight locus are determined in the range of 4000K to 10000K.

$$y = -3.000x^2 + 2.870x - 0.275 \quad (1)$$

$$x = \left(\frac{-4.6070 \times 10^9}{T_{cp}^3}\right) + \left(\frac{2.9678 \times 10^6}{T_{cp}^2}\right) + \left(\frac{0.09911 \times 10^3}{T_{cp}}\right) +$$
$$0.244063 \, (4000K \leq T_{cp} \leq 7000K)$$

$$z = \left(\frac{-2.00064 \times 10^9}{T_{cp}^3}\right) + \left(\frac{1.9081 \times 10^6}{T_{cp}^2}\right) + \left(\frac{0.24748 \times 10^3}{T_{cp}}\right) +$$
$$0.237040 \, (7000K < T_{cp} \leq 25000K)$$

Tristimulus values X, Y, and Z are computed from the values of the xy coordinates determined by equation (1). Regarding the tristimulus values X, Y, and Z, R, G, and B values are determined by using a conversion equation (2) from the XYZ system to the RGB system by CIE Rec. 709. By assuming the R value, the G value, and the B value determined in this manner to be an R signal, a G signal, and a B signal, respectively, the following description will be given.

$$\begin{cases} R = 3.240479 \times X - 1.53715 \times Y - 0.498535 \times Z \\ G = -0.969256 \times X + 1.875991 \times Y + 0.041556 \times Z \\ B = 0.055648 \times X - 0.204043 \times Y + 1.057311 \times Z \end{cases} \quad (2)$$

Figure 3:
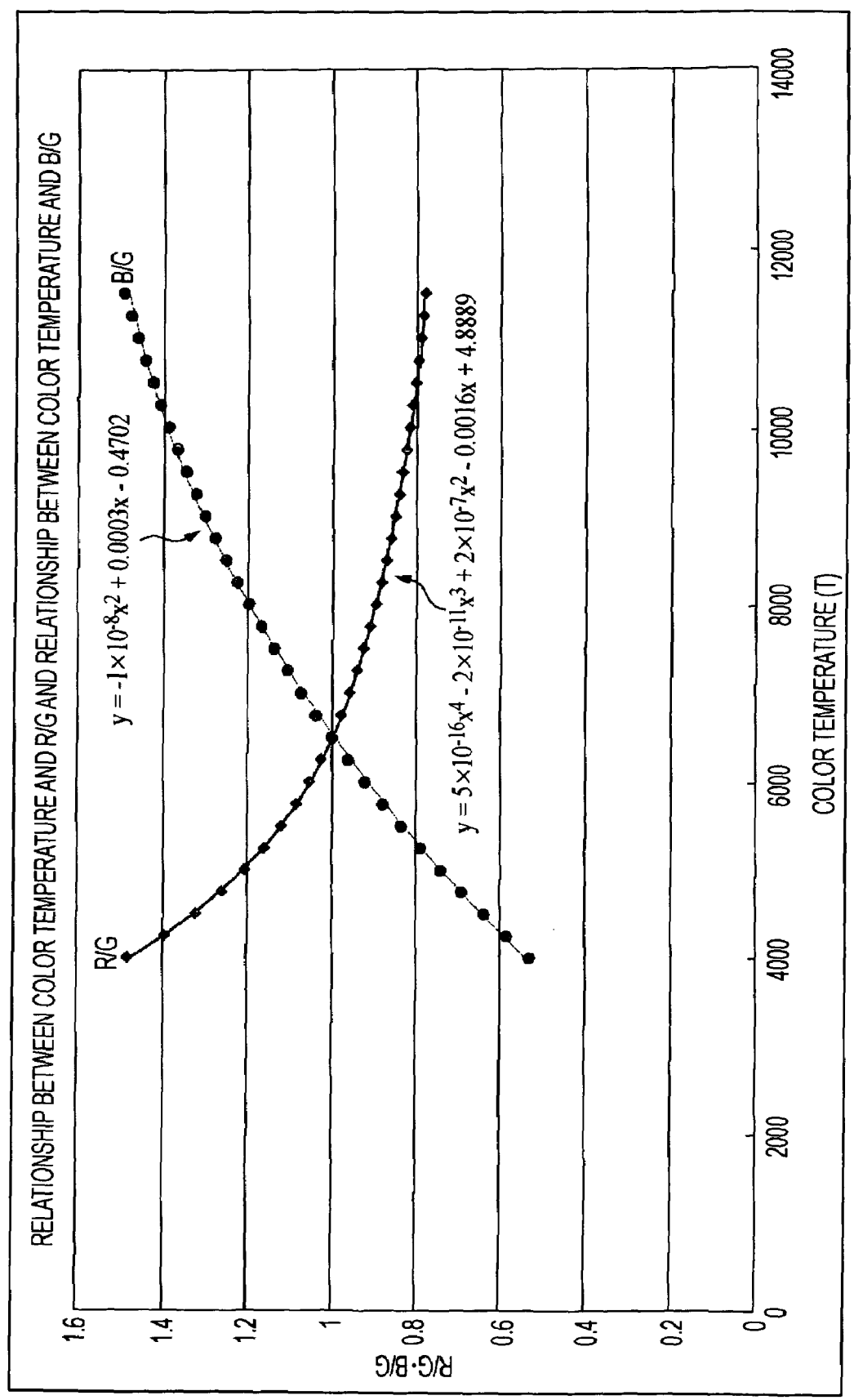
FIG. 3 is a graph showing an example of a relationship between an R/G signal and color temperature and a relationship between a B/G signal and color temperature.

In general, the white balance process is performed on the basis of an R/G value (assumed to be an R/G signal) and a B/G value (assumed to be a B/G signal), which are based on a G signal. Therefore, first, an R/G signal and a B/G signal are determined from the R signal, the G signal, and the B signal determined by equation (2). The relationship between the R/G signal and color temperature and the relationship between the B/G signal and color temperature, as an example is shown in the graph of FIG. 3, become curves approximated with complex polynomials.

That is, when the color temperature is plotted along the x axis and the R/G signal or the B/G signal is plotted along the y axis, the relationship between the R/G signal and color temperature becomes, for example:

$$y=5\times10^{-16}x^4-2\times10^{-11}x^2+2\times10^{-7}x^2-0.0016x+4.8889$$

The relationship between the B/G signal and color temperature becomes, for example:

$$y=-1\times10^{-8}x^2+0.0003x-0.4702$$

In particular, with respect to the B/G signal, an amount of increase greatly changes between when the color temperature is high and when it is low. Therefore, it is difficult to obtain a high degree of approximation unless a high-order function of a third or fourth order is used.

Figure 4:
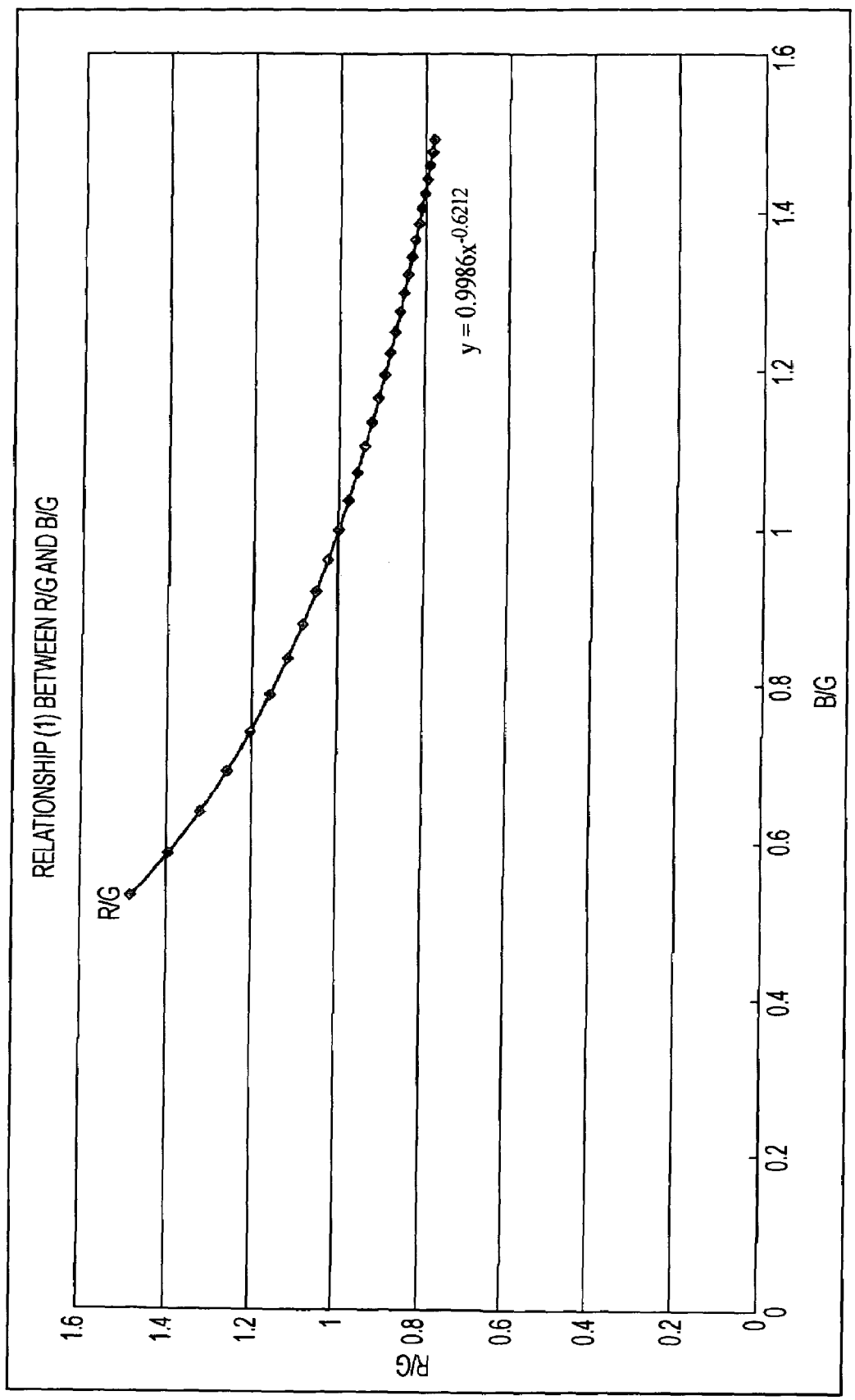
FIG. 4 is a graph showing an example of a relative relationship between an R/G signal and a B/G signal.
Figure 5:
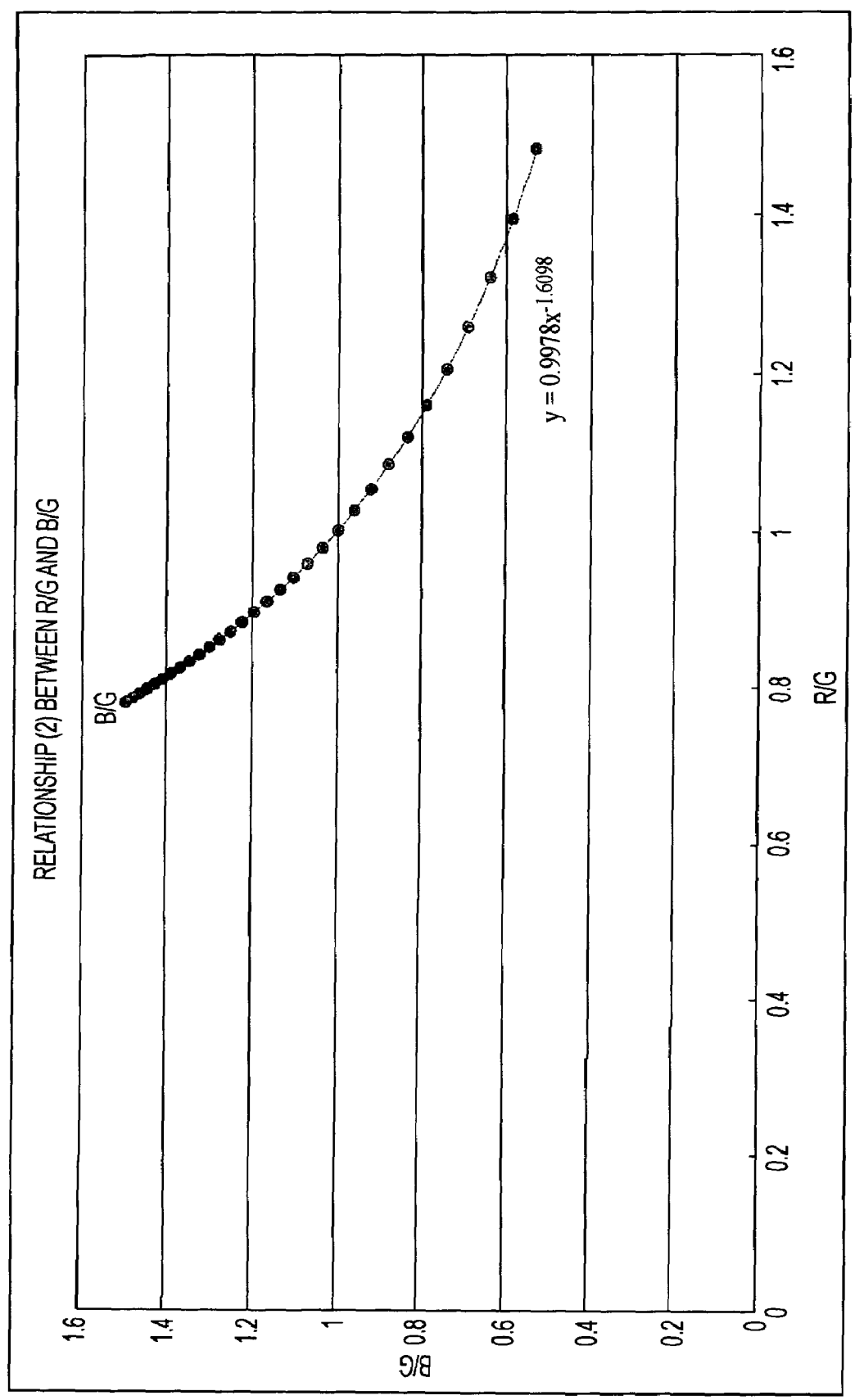
FIG. 5 is a graph showing an example of a relative relationship between an R/G signal and a B/G signal.

A relative relationship between the R/G signal and the B/G signal will now be considered. When the B/G signal is plotted along the x axis and the R/G signal is plotted along the y axis, as an example is shown in FIG. 4, on the B/G-R/G plane, a curve that can be approximated by a power equation of $y=0.9986x^{-0.6212}$ is drawn. Also, when the R/G signal is plotted along the x axis and the B/G signal is plotted along the y axis, as an example is shown in FIG. 5, on the R/G-B/G plane, a curve that can be approximated by a power equation of $y=0.9978x^{-1.6098}$ is drawn. The capability of approximation by a power equation indicates that these relationships can be represented by logarithms.

Figure 6:
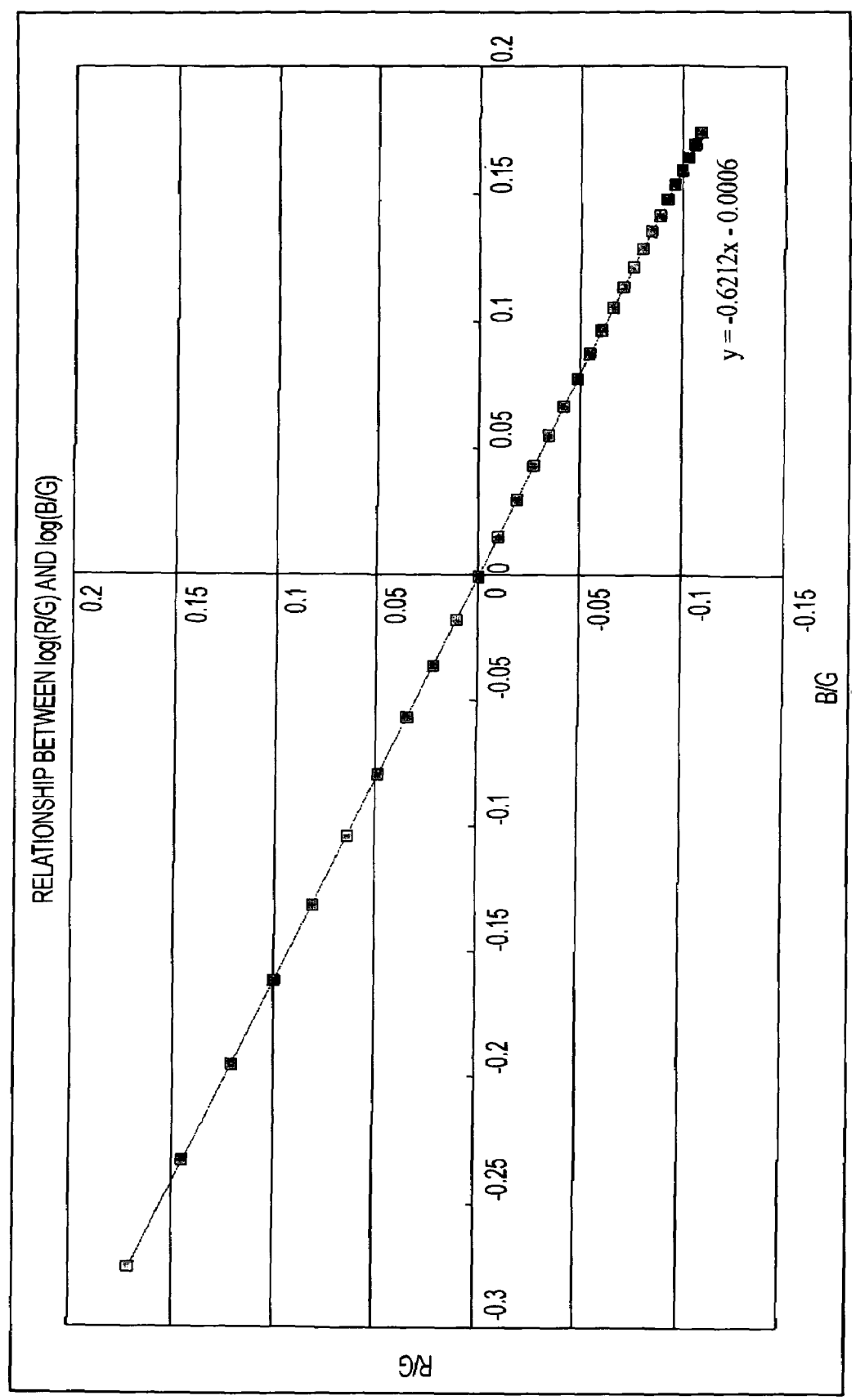
FIG. 6 is a graph showing an example of a relationship between log(R/G) and log(B/G)

Accordingly, log(R/G) and log(B/G) are obtained by calculating the logarithm of each of the R/G signal and the B/G signal, and are plotted on a log(B/G)-log(R/G) plane in which log(B/G) and log(R/G) are plotted along the x axis and along the y axis, respectively. As an example is shown in FIG. 6, it can be seen that the relationship between log(R/G) and log(B/G) becomes linear, and can be approximated by a first-order equation (y=−0.6212x −0.0006).

Figure 7:
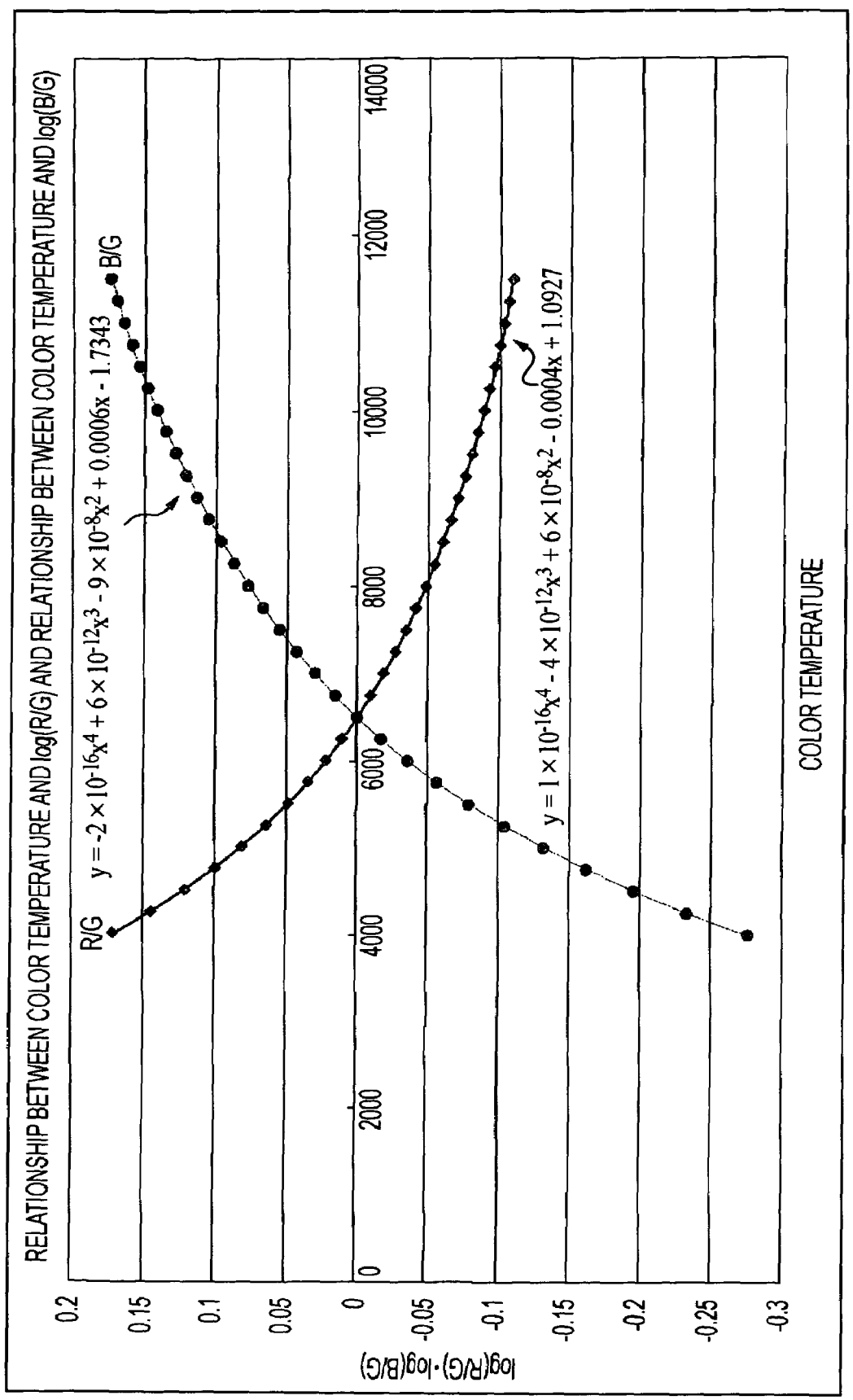
FIG. 7 is a graph showing an example of a relationship between log(R/G) and color temperature and a relationship between log(B/G) and color temperature.

On the other hand, even when the logarithm of each of the R/G signal and the B/G signal is calculated, when compared to the color temperature, the relationship between log(R/G) and color temperature and the relationship between log(B/G) and color temperature, as an example is shown in FIG. 7, become each a curve approximated by a polynomial. That is, when the color temperature is plotted along the x axis and log(R/G) or log(B/G) is plotted along the y axis, the relationship between log(R/G) and the color temperature becomes, for example:

$$y=1\times10^{-16}x4-4\times10^{-12}x^3+6\times10^{-8}x^2-0.0004x+1.0927,$$

and the relationship between log(B/G) and the color temperature becomes, for example:

$$y=-2\times10^{-16}x4+6\times10^{-12}x^3-9\times10^{-8}x^2+0.0006x-1.7343$$

Figure 8:
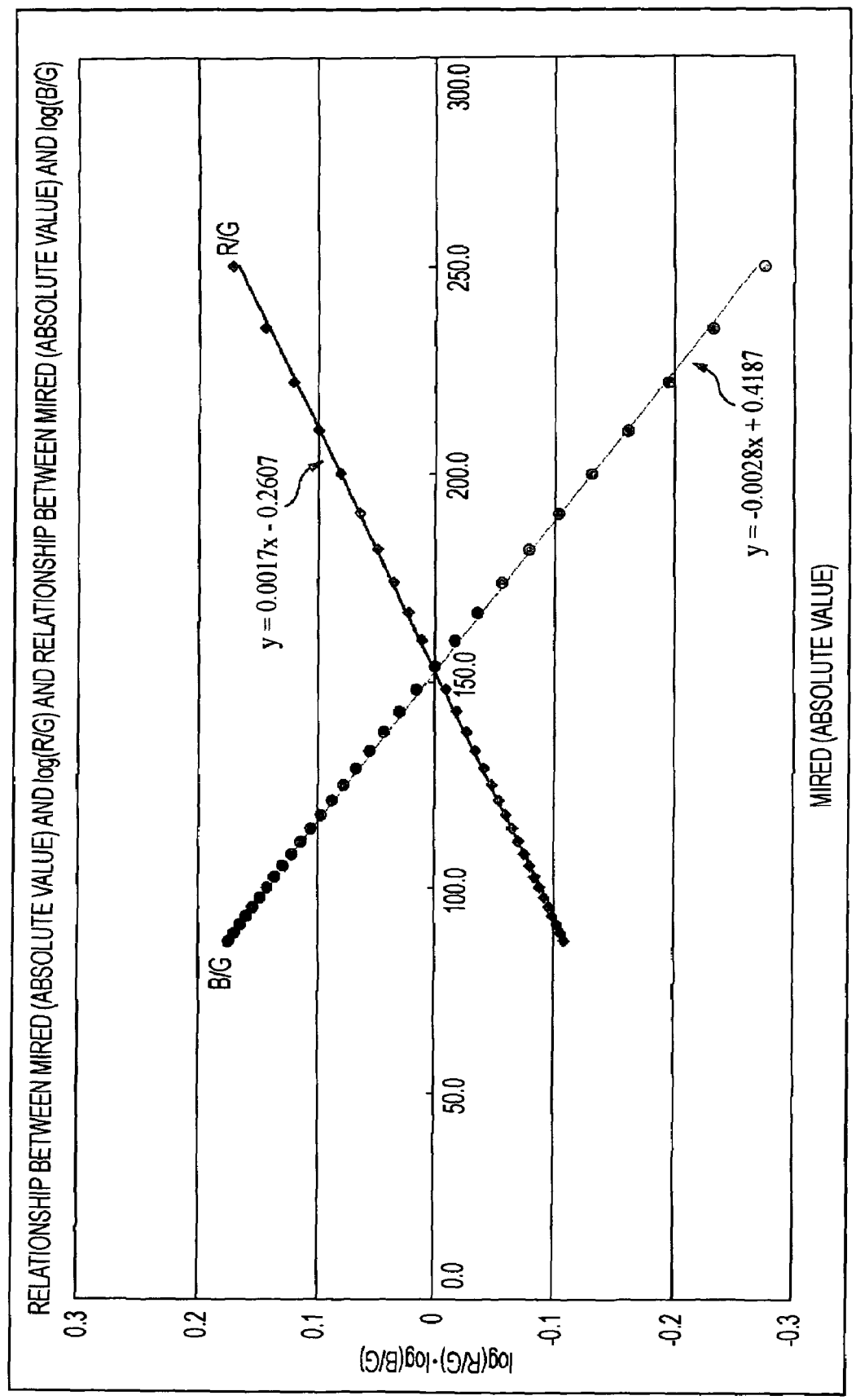
FIG. 8 is a graph showing an example of a relationship between log(R/G) and Mired and a relationship between log(B/G) and Mired.

In comparison, the relationship between Mired values (to be described later) and log(R/G) and the relationship between Mired values and log(B/G) will be considered. In this case, as an example is shown in FIG. 8, the relationship between log(R/G) and Mired and the relationship between log(B/G) and Mired become each linear, and it can be seen that approximation is possible by a first-order equation. That is, when the Mired values are plotted along the x axis and log(R/G) or log(B/G) is plotted along the y axis, the relationship between log(R/G) and Mired becomes, for example:

$$y=0.0017x-0.2607,$$

and the relationship between log(B/G) and Mired becomes, for example:

$$y=-0.0028x+0.4187$$

In FIG. 8, since the y axis represents the logarithm of the R/G signal or the B/G signal, the Mired values in the x axis are represented by absolute values with respect to the color temperature.

In the foregoing, calculations for the R/G signal and the B/G signal are performed on the basis of the color temperature. When the color temperature changes, the color of light changes. However, as can be seen from FIG. 3 described above, the amount of change of color is not fixed with respect to the amount of change of the color temperature. For example, even at the same color temperature difference, the change in the color is large when the color temperature is low and the change in the color is small when the color temperature is high. In the meanwhile, as one of units during color conversion, Mired (Micro Reciprocal Degree) is defined. In the Mired, the amount of change of color with respect to the amount of change of a Mired value is fixed regardless of the highness or lowness of the color temperature.

The Mired will be described briefly. The Mired value indicates relative color temperature conversion performance when based on a particular color temperature, which is a value such that $1,000,000 (=10^6)$ is divided by color temperature (or correlation color temperature). For example, as a result of performing color conversion filtering of 35 Mireds on light whose color temperature is 3200K (Kelvin), the corresponding light is converted into light having a color temperature of approximately 2878K. Furthermore, by using a color conversion filter of −35 Mireds for light of 6500K, the corresponding light is converted into light having a color temperature of approximately 8400K.

Figure 9:
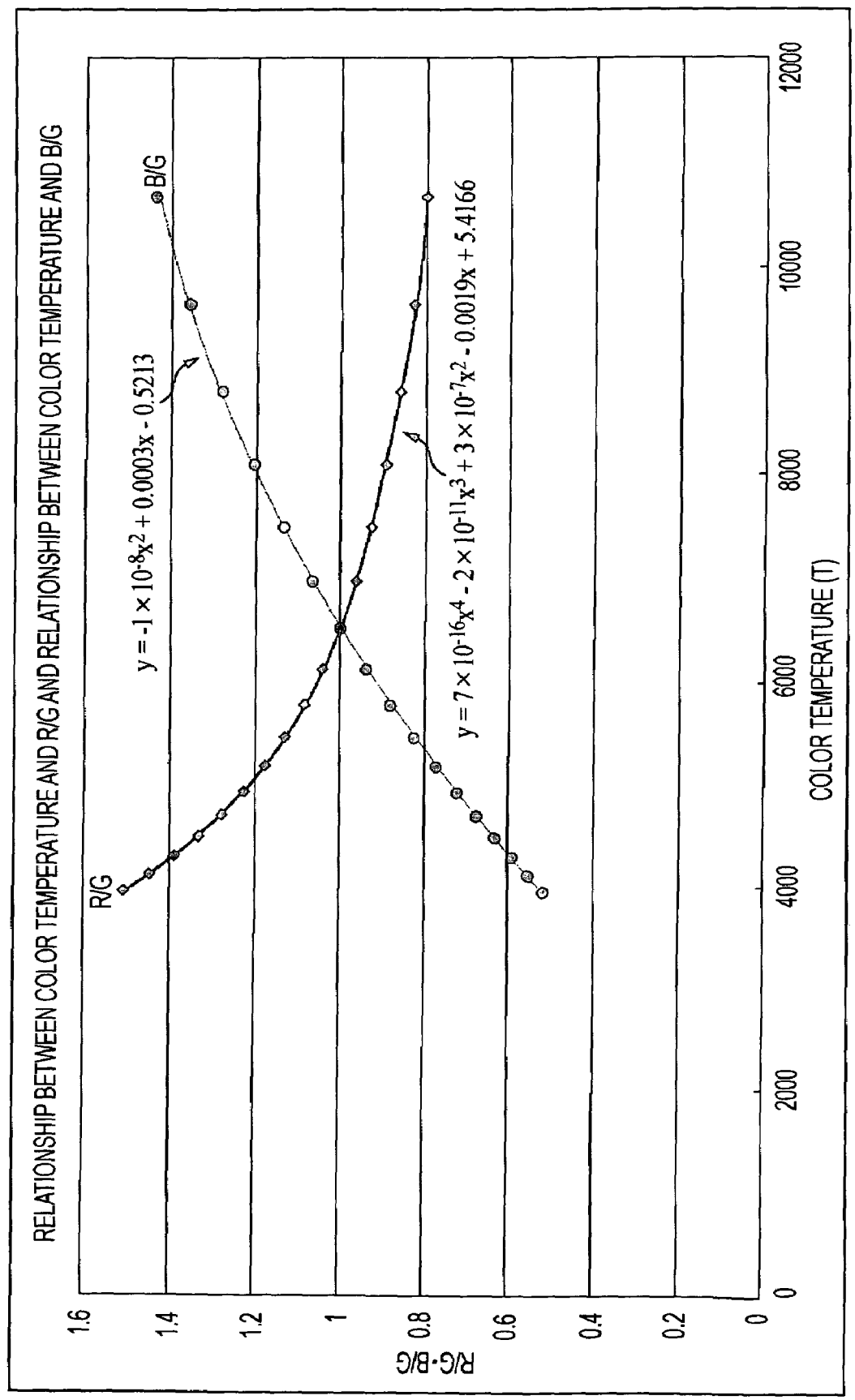
FIG. 9 is a graph showing an example of a relationship between an R/G signal and color temperature and a relationship between a B/G signal and color temperature.

Here, the Mired is changed at equal intervals, and the corresponding color temperature is determined. FIG. 9 shows an example of the relationship between an R/G signal and color temperature and the relationship between a B/G signal and color temperature in this case. When compared to FIG. 3, the intervals of the plot along the x axis are changed in accordance with a reciprocal of the color temperature. The differences of the coefficients of the equation shown in FIG. 9 from the corresponding values shown in FIG. 3 are caused by errors in approximation calculations.

Figure 10:
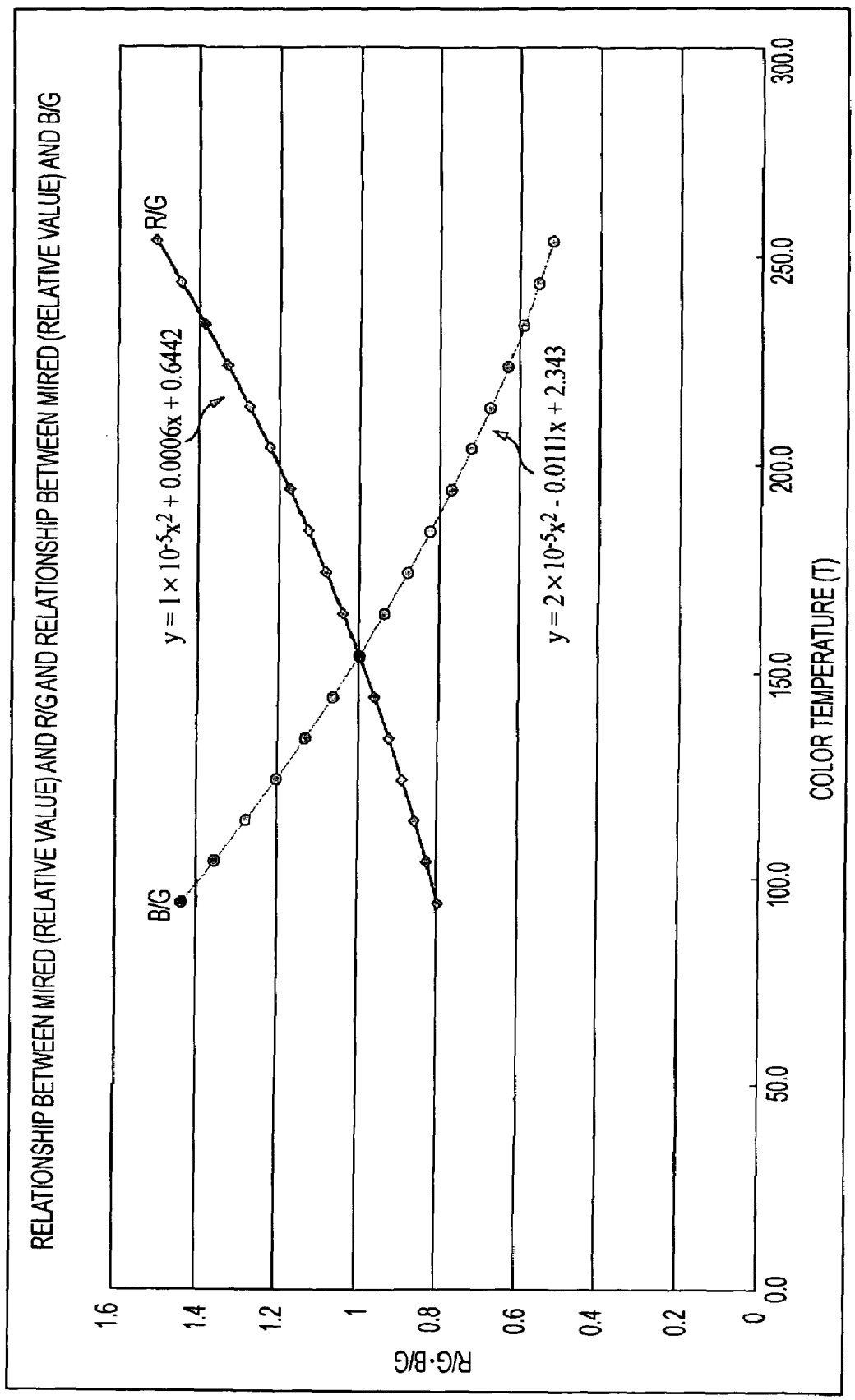
FIG. 10 is a graph in which an example of a relationship between an R/G signal and color temperature and a relationship between a B/G signal and color temperature are shown and in which the x axis shows Mired.

An example when the x axis of FIG. 9 is represented by Mired values is shown in a graph of FIG. 10. The x axis is plotted at equal intervals. Since the y axis shows an R/G signal or a B/G signal, the Mired values along the x axis are relative values to the color temperature. When the Mired values are plotted along the x axis and the R/G signal or the B/G signal is plotted along the y axis, the relationship between the R/G signal and the Mired values becomes, for example:

$$y=1\times10^{-5}x^2+0.0006x+0.6442$$

The relationship between the B/G signal and the Mired values becomes, for example:

$$y=2\times10^{-5}x^2-0.0111x+2.343$$

Figure 11:
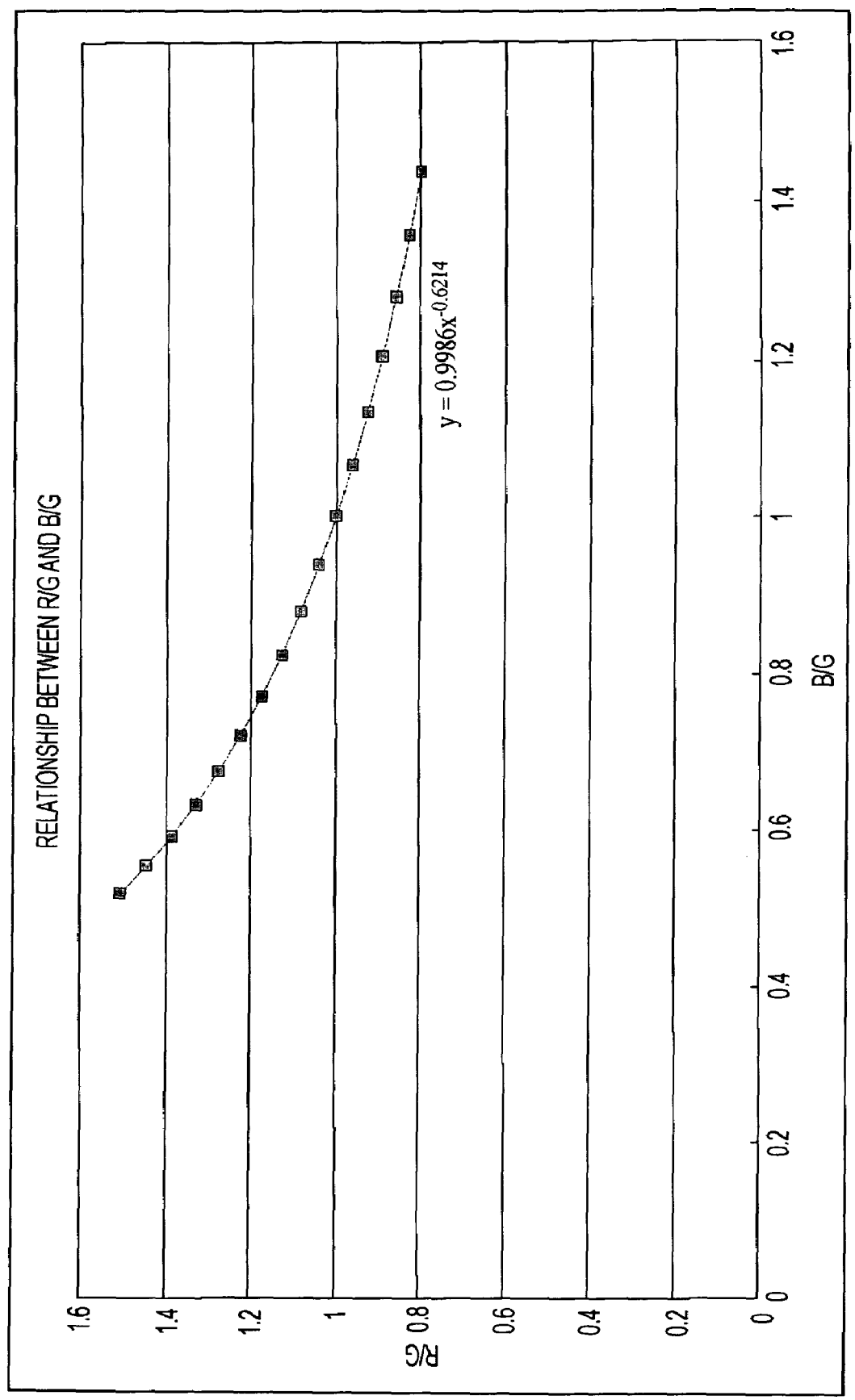
FIG. 11 is a graph showing an example of a relative relationship between an R/G signal and a B/G signal when considered on the basis of Mired.

FIG. 11 shows an example of a correlation relationship between an R/G signal and a B/G signal when considered on the basis of Mired. FIG. 11 differs from FIG. 4 only in that plotting intervals are changed. That is, when a B/G signal is plotted along the x axis and an R/G signal is plotted along the y axis, on a B/G-R/G plane, as shown in FIG. 11, a curve that can be approximated by a power equation of $y=0.9986x-0.6214$ is drawn. Also, when an R/G signal is plotted along the x axis and a B/G signal is plotted along the y axis, the same applies to FIG. 5, and accordingly, descriptions are omitted herein. The differences of the coefficients of the equation shown in FIG. 11 from the corresponding values of FIG. 4 are caused by errors in approximation calculations.

In the manner described above, even when based on the Mired values, since the relationship between an R/G signal and a B/G signal can be approximated with a power equation, this shows that these relationships can be represented by a logarithm.

Figure 12:
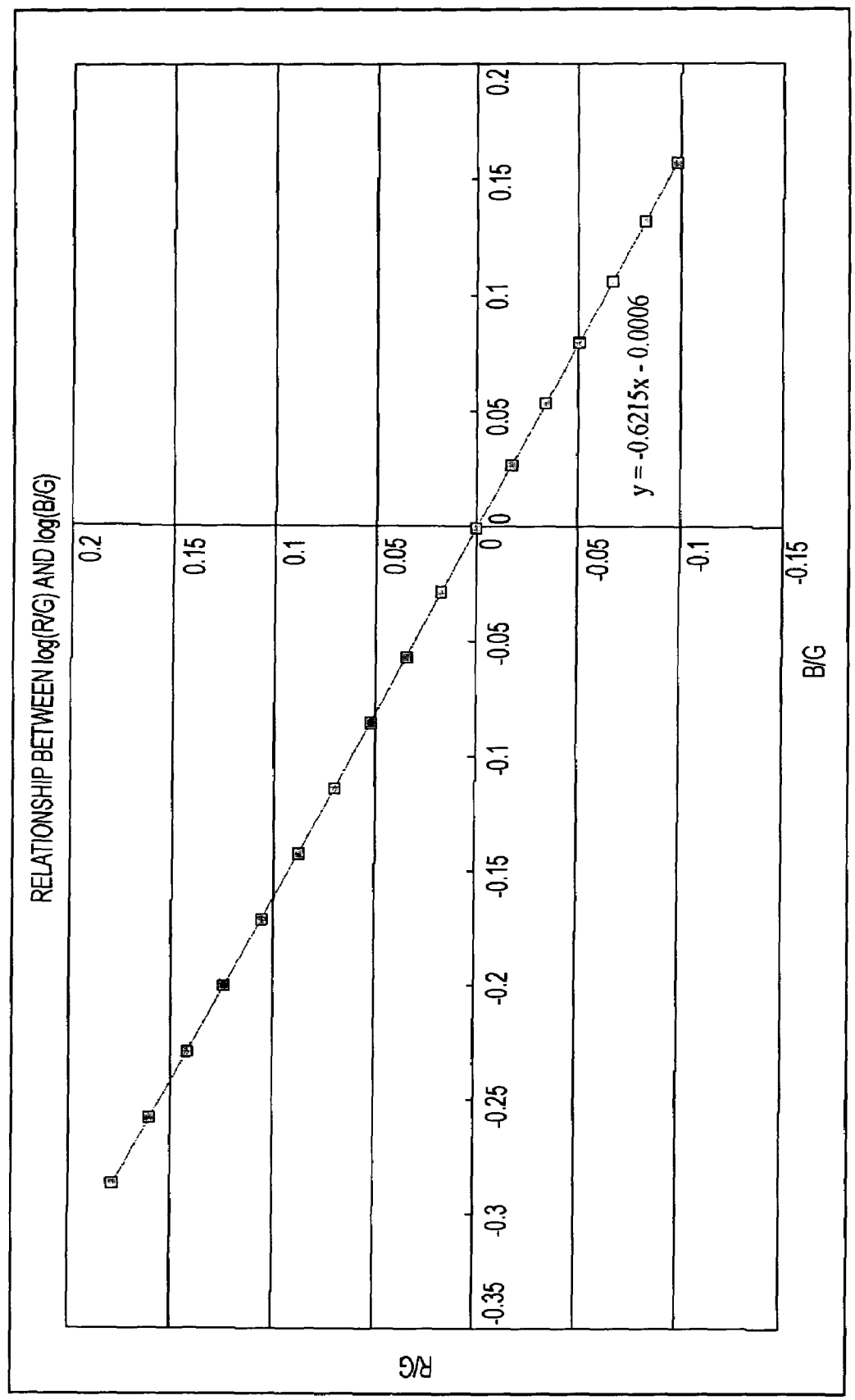
FIG. 12 is a graph showing an example of a relative relationship between log(R/G) and log(B/G)

Accordingly, similarly to the above-described case of the reference color temperature, $\log(R/G)$ and $\log(B/G)$ are obtained by calculating the logarithm of each of the R/G signal and the B/G signal, and these are plotted on a $\log(B/G)$-$\log(R/G)$ plane in which $\log(B/G)$ and $\log(R/G)$ are plotted along the x axis and along the y axis, respectively. As an example is shown in FIG. 12, the relationship between $\log(R/G)$ and $\log(B/G)$ becomes linear. Thus, it can be seen that the relationship can be approximated by a first-order equation ($y=-0.6215x-0.0006$). Furthermore, it can be seen that, when based on Mired, unlike FIG. 6 described above, plotted points are changed at equal intervals with respect to the x axis and the y axis.

Figure 13:
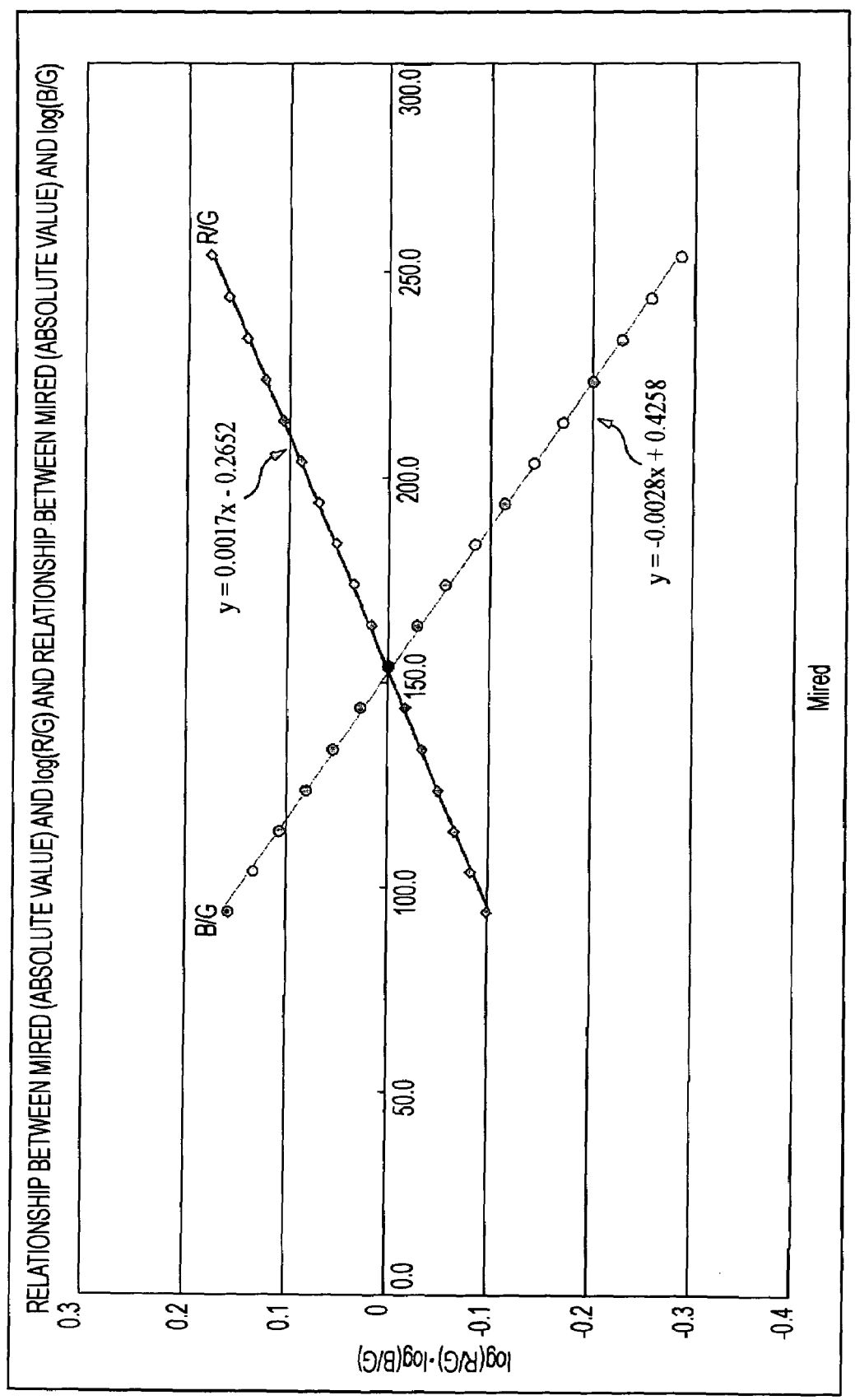
FIG. 13 is a graph showing an example of a relationship between log(R/G) and Mired and a relationship between log(B/G) and Mired.

The relationship between $\log(R/G)$ and Mired and the relationship between $\log(B/G)$ and Mired each become linear as an example is shown in FIG. 13, and can be approximated with a first-order equation, and the values along the y axis are changed at equal intervals in response to equal interval changes of the Mired values. When the Mired values are plotted along the x axis and $\log(R/G)$ or $\log(B/G)$ is plotted along the y axis, the relationship between $\log(R/G)$ and Mired becomes, for example:

$$y=0.0017x-0.2652$$

and the relationship between $\log(B/G)$ and Mired becomes $$y=-0.0028x+0.4258$$

The differences of the coefficients of the equations shown in FIG. 13 from the corresponding values in FIG. 8 described above are caused by errors in approximation calculations. In FIG. 13, since the y axis shows the logarithm of the R/G signal or the B/G signal, the Mired values along the x axis are represented by absolute values with respect to the color temperature.

As described above, $\log(R/G)$ or $\log(B/G)$ can be computed from the Mired values by using a first-order equation (see FIG. 13). Also, there is a correlation that can be represented by a first-order equation between $\log(R/G)$ and $\log(B/G)$ (see FIG. 12). Thus, it can be derived that one of the values of $\log(R/G)$ and $\log(B/G)$ can be computed from the other value. In the embodiment of the present invention, on the basis of the result, white balance is corrected and changed.

A more specific example according to an embodiment of the present invention will now be described below. The CPU 16 normalizes an R signal and a B signal by means of a G signal on the basis of the R signal, the G signal, and the B signal obtained from the image signal processor 13, and generates an R signal R/G based on the G signal and a B signal B/G based on the G signal. Next, the R signal R/G and the B signal B/G are each converted on a logarithmic plane. In the following, a value such that the R signal R/G is logarithmically converted is expressed as logR, and a value such that the B signal B/G is logarithmically converted is expressed as logB. That is, the above-described $\log(R/G)$ and $\log(B/G)$ correspond to logR and logB, respectively.

Figure 14:
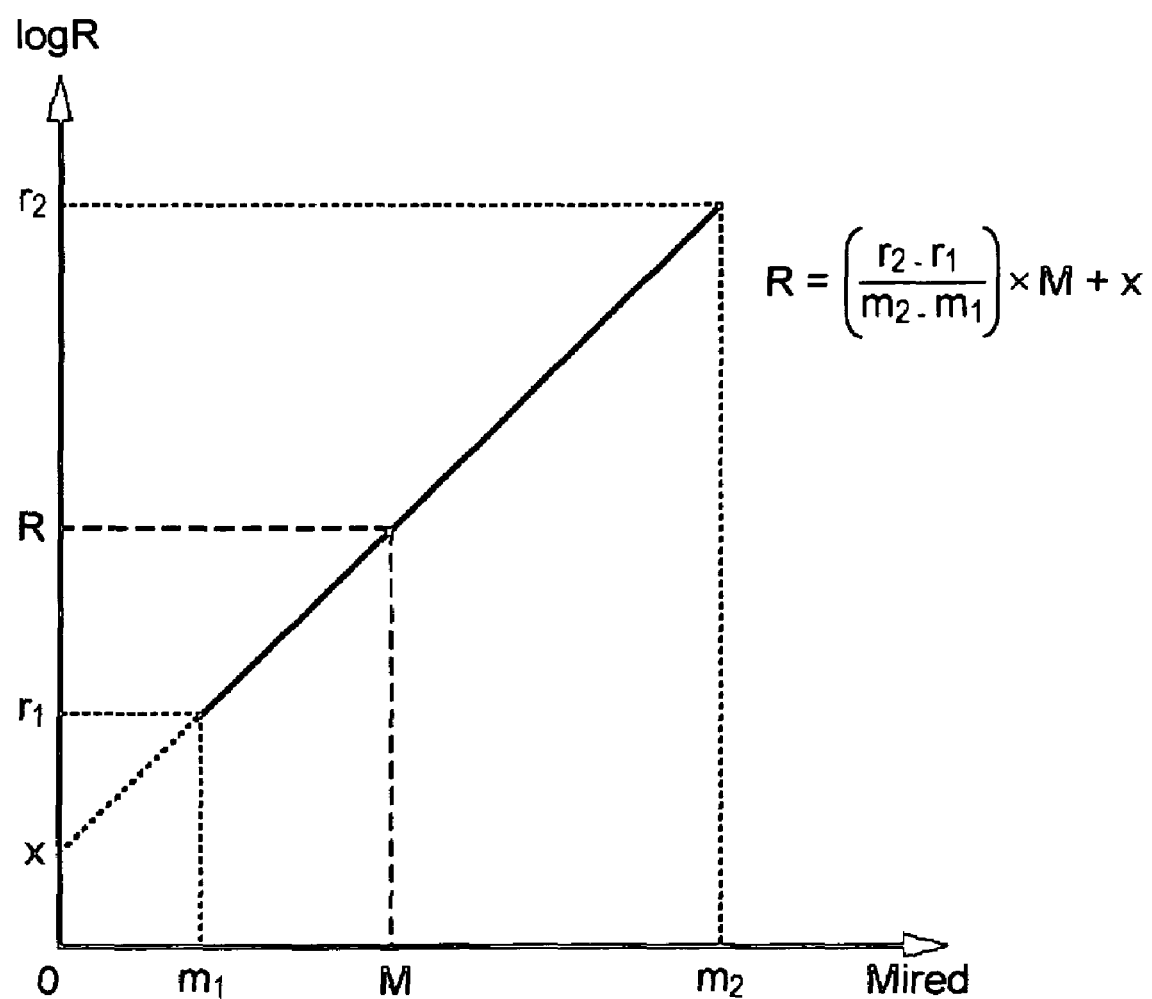
FIG. 14 is a schematic chart showing blackbody radiation in a relationship between Mired values and logR that is a logarithmically converted R signal R/G.
Figure 15:
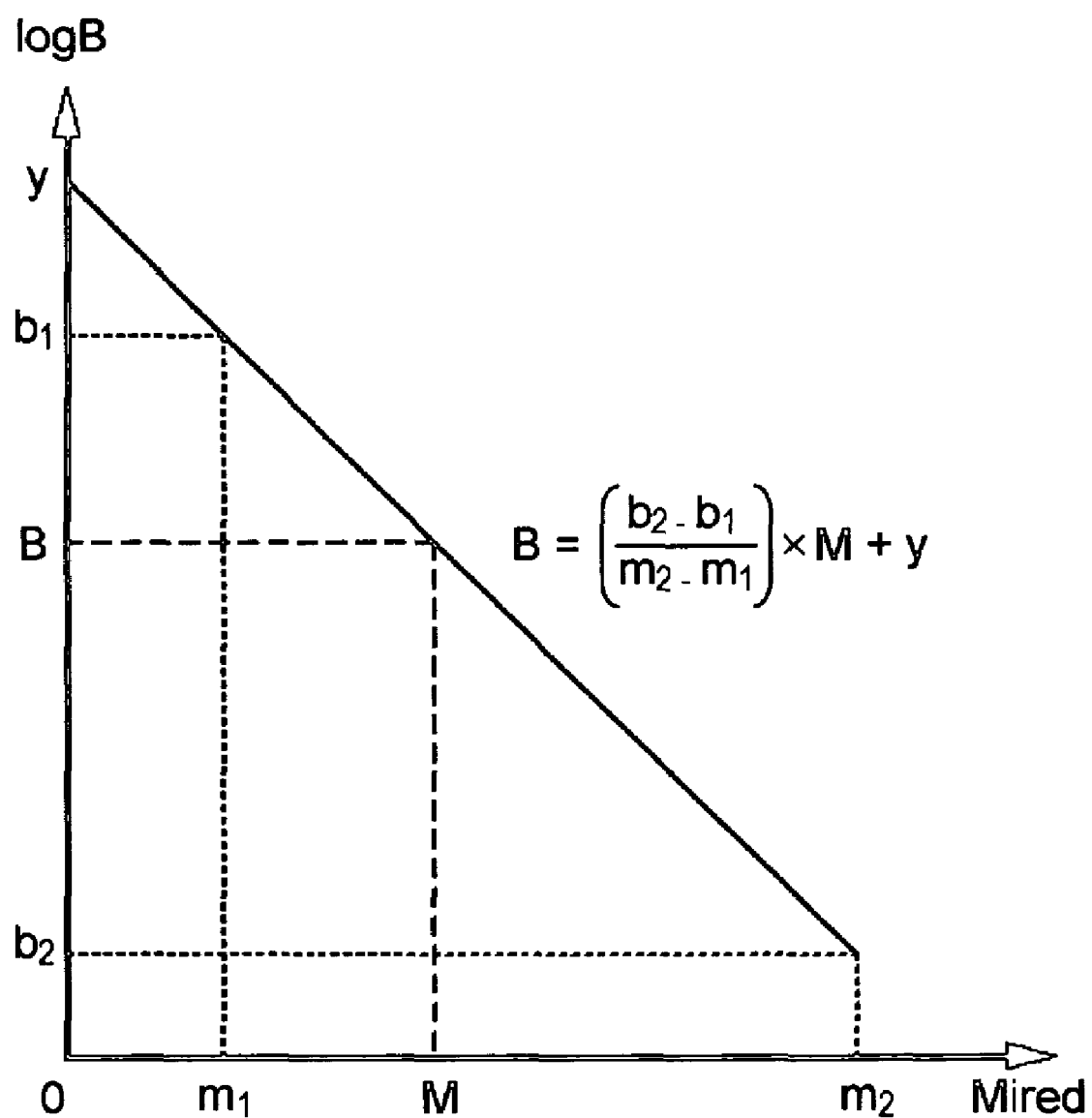
FIG. 15 is a schematic chart showing blackbody radiation in a relationship between Mired values and logB that is a logarithmically converted B signal B/G.

FIG. 14 shows blackbody radiation in the relationship between the Mired values and logR that is a logarithmically converted R signal R/G. FIG. 15 shows blackbody radiation in the relationship between the Mired values and logB that is a logarithmically converted B signal B/G. FIGS. 14 and 15 show an embodiment in which the example shown in FIG. 13 is applied. As is also described above, in this manner, the blackbody radiation becomes linear on each plane in which an R signal R/G and a B signal B/G are logarithmically converted. Each of the relationships can be represented by each of first-order equations shown in the following equations (3) and (4). Equation (3) shows the relationship between the Mired values and logR, which is shown in FIG. 14. Equation (4) shows the relationship between the Mired values and logB, which is shown in FIG. 15.

$$R = \left(\frac{r_2 - r_1}{m_2 - m_1}\right) \times M + x \quad (3)$$

$$B = \left(\frac{b_2 - b_1}{m_2 - m_1}\right) \times M + y \quad (4)$$

In equation (4) that shows blackbody radiation in the relationship between the Mired values and logB, when the gradient is changed into a constant as $a=(b_2-b_1)/(m_2-m_1)$ equation (4) can be represented by a simple first-order equation as in the following equation (5):

$$B = aM + y \quad (5)$$

Figure 16:
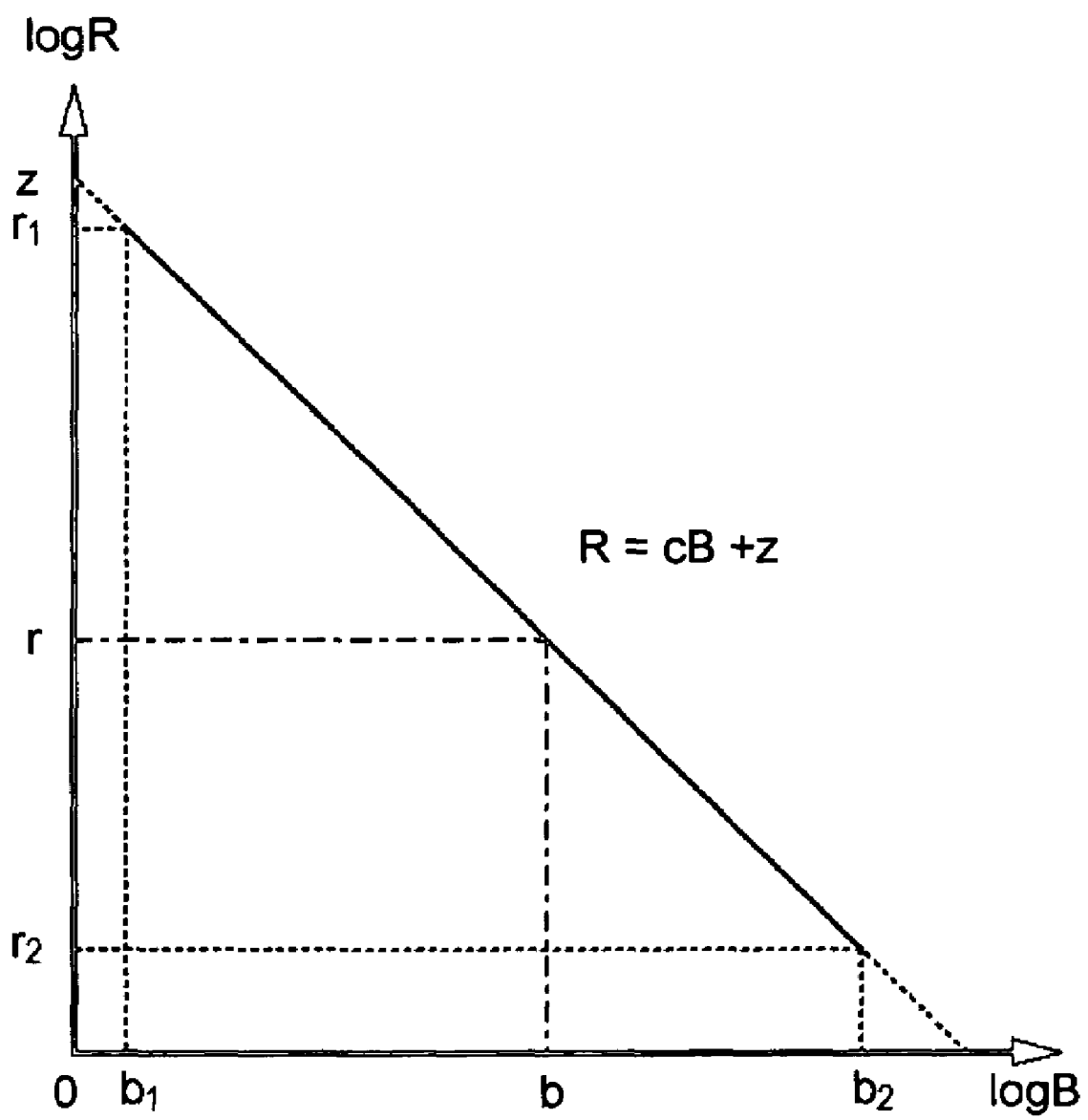
FIG. 16 is a schematic chart showing blackbody radiation on an R-B logarithmic plane in which logB is plotted along the horizontal axis and logR is plotted along the vertical axis.

On the other hand, with respect to blackbody radiation on an R-B logarithmic plane (hereinafter referred to as a "logR-logB plane") in which logB is plotted along the horizontal axis and logR is plotted along the vertical axis, as an example is shown in FIG. 16, a linear relationship is obtained. FIG. 16 shows an embodiment in which the above-described example in FIG. 12 is applied more specifically. As is also described above, in this manner, the relationship between logB and logR can also be represented by a first-order equation. That is, the following equation (6) is obtained from equations (3) and (4).

$$R = \left(\frac{r_2 - r_1}{b_2 - b_1}\right) \times B - \left\{\left(\frac{r_2 - r_1}{b_2 - b_1}\right) \times y + x\right\} \quad (6)$$

Here, when the gradient is converted into a constant as $c=(r_2-r_1)/(b_2-b_1)$, equation (6) can be represented by a simple first-order equation as in the following equation (7):

$$R = cB + z \quad (7)$$

When a particular white balance output has been determined, by using a first-order equation by equation (7), corrections at a color temperature for output and computations for fine adjustments become very easy. For example, when the value of logR is desired to be determined from the relationship of logR-logB as in FIG. 16, logR can be determined by substituting the value of logB into "B" of equation (7) and by calculating a first-order equation.

Next, a description will be given of a more specific example of the method for correcting and changing white balance output according to an embodiment of the present invention. In the following, a description will be given of a case in which, when white balance output is determined to be a particular fixed value, the determined white balance is to be corrected in accordance with instructions from a user. As an example, a case is described in which, when white balance output is determined under the illumination of an incandescent lamp, a "reddish tinge" by illumination of the incandescent lamp is desired to be added to a captured image. In this case, the white balance is corrected toward lower color temperatures.

In the above-described imaging apparatus 1, correction values of color temperature are specified by stepwise values, and the steps correspond to the Mired values. For example, correction values of color temperature are specified at 15 steps from step (−7) to step (+7), which is changed by 5 Mireds for each step. In this case, step (0) specifies a correction of 0 Mireds to the current white balance output, and step (−7) specifies a correction of −35 Mireds to the current white balance output.

As an example, when the white balance output is a color temperature of 5500K, by specifying step (−7), the white balance output is corrected to the color temperature of 4600K on the basis of the Mired value (=−35) corresponding to step (−7).

Figure 17:
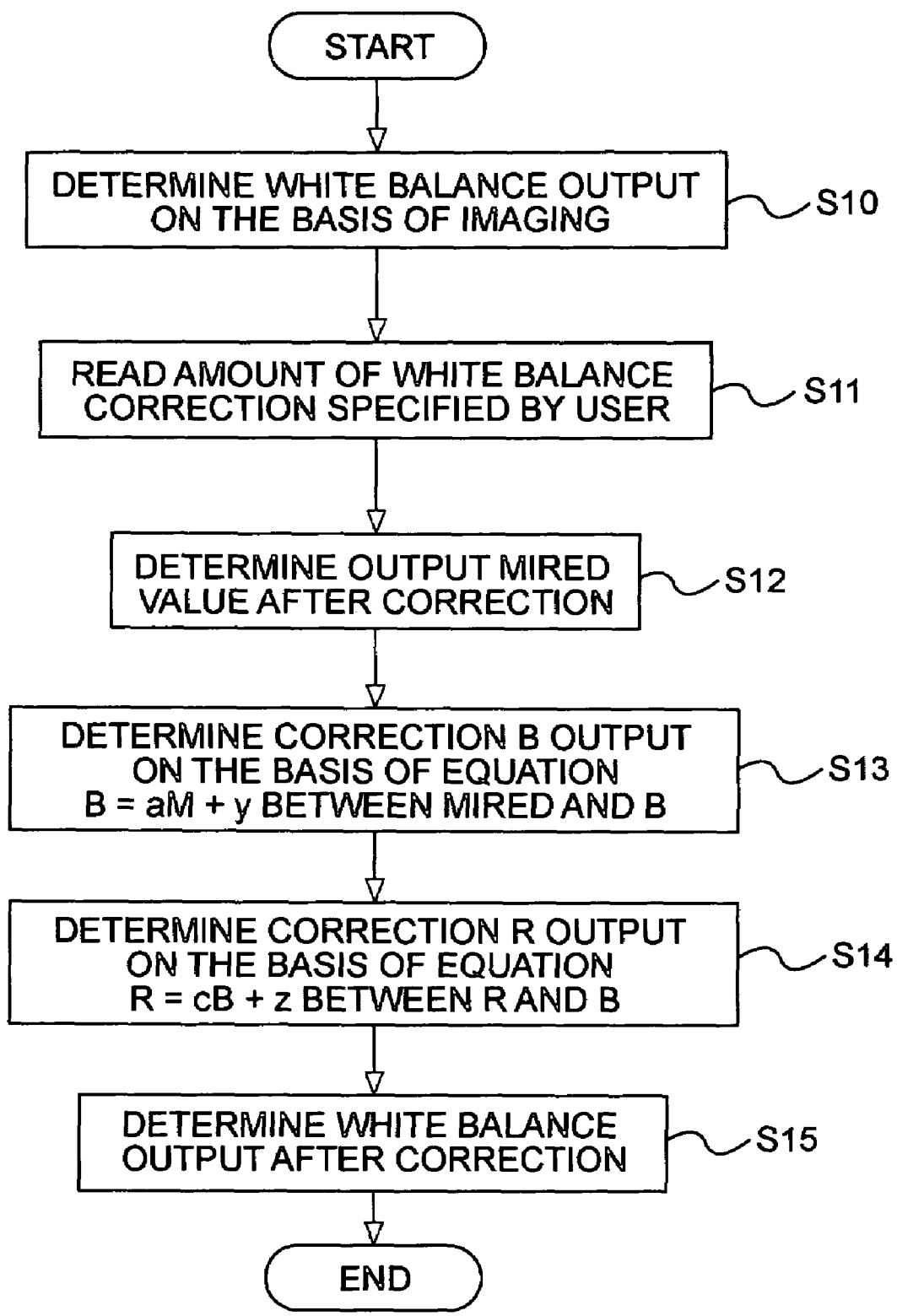
FIG. 17 is a flowchart showing an example of processing when white balance output is to be corrected on the basis of specification by a user.

FIG. 17 is a flowchart showing an example of processing when white balance output is to be corrected on the basis of specification by the user. Initially, in step S10, on the basis of an imaging signal output from the imaging device 11, white balance output is determined in the manner described above. The value of the determined white balance output is held by the CPU 16. Next, the CPU 16 reads the amount of correction of white balance, which is specified to the imaging apparatus 1 by the user in a predetermined manner. The correction value is, for example, specified in step values to an operation section (not shown) and is stored in the RAM 18. In step S12, the Mired value when the read correction value is converted into a color temperature is calculated, and the Mired correction value corresponding to the output after correction is determined.

On the basis of the Mired value determined in step S12, in the subsequent step S13, the amount of correction of the B signal is calculated by using a first-order equation indicating the relationship between the Mired values and logB, which is shown in FIG. 15, that is, the relationship of the Mired-logB plane by equation (5).

Next, in step S14, on the basis of the amount of correction of the B signal determined in step S13, the amount of correction of the R signal is calculated by using a first-order equation indicating the relationship between the R signal and the B signal, which is shown in FIG. 16, that is, the relationship between the logR plane and the logB plane by equation (7). Then, in step S15, the white balance output after correction is determined.

Figure 18:
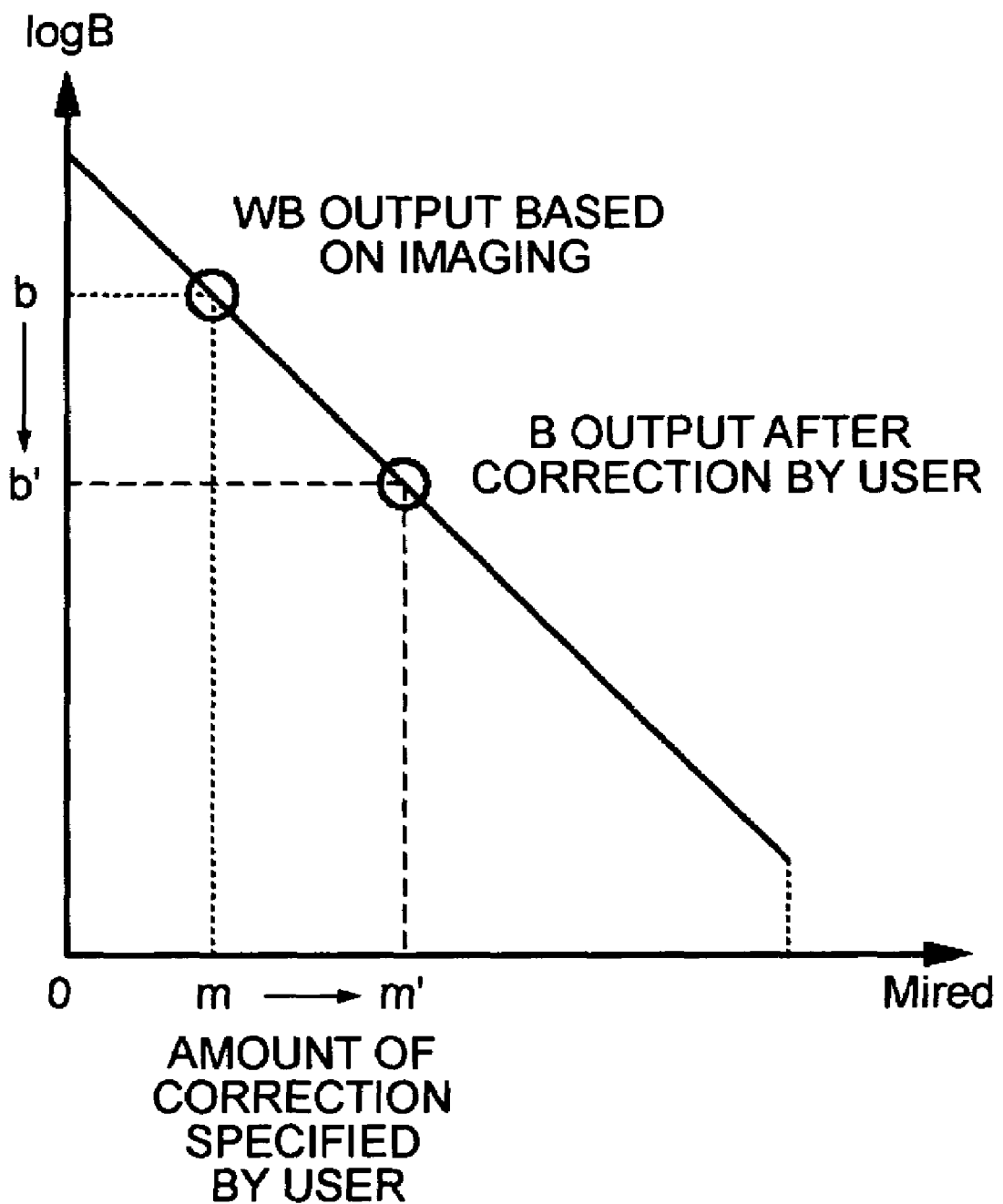
FIG. 18 illustrates processing for determining the amount of correction of white balance on the basis of the specification by the user.

That is, as an example is shown in FIG. 18, when the white balance (WB) output based on the captured image lies on the blackbody radiation represented by a straight line on the logarithmic plane of the B signal, the amount of correction indicated by the user is input with the Mired value. The value of the logB after correction, corresponding to the Mired value, is determined. In response to the indication by the Mired value, the value of the logB is changed from "b" to "b'". Then, on the basis of the value of logB after correction, the value of logR after correction is determined in accordance with equation (7).

In step S15, for example, processes for converting the logR value determined in step S14 and the logB value determined in step S13 into values suitable for adjusting the gains of the amplifier 31A and the amplifier 31B, respectively, are performed. In an example, the logR value and the logB value, each of which is a value on the logarithmic plane, are converted into values that can be represented linearly. The correction value of the R signal and the correction value of the B signal are supplied to the WB amplifier gain setting section 30, whereby they are, for example, added to the gains of the amplifier 31A and the amplifier 31B, which are obtained by the white balance output set in step S10.

As described above, when the relationship between the R signal and the color temperature and the relationship between the B signal and the color temperature are represented on a logarithmic axis, these relationships are represented by first-order equations. When these first-order equations are described in a program stored in the ROM 17 and are held in the CPU 16, the relationship between color temperature and white balance can be calculated very easily. Furthermore, since the relationship between the R signal and color temperature and the relationship between the B signal and color temperature are calculated by first-order equations, there is no need to have a table or the like in which values of blackbody radiation are stored.

Furthermore, since there is no need to approximate blackbody radiation with a plurality of straight lines, it is possible to correct white balance with higher accuracy.

In the foregoing, a case in which the user specifies the amount of correction with respect to a predetermined white balance output has been described. Alternatively, the present invention can be applied to a case in which white balance is deviated for the purpose of effects. In the foregoing, a color temperature is determined on the basis of Mired values input in a stepwise manner. The present invention is not limited to this example and can also be applied to a case in which a color temperature is directly specified. That is, in these cases, it is possible to easily determine the output value of white balance by computations of a first-order equation, and complex computations and case separations, which have been performed before, are not necessary.

Next, a modification of the embodiment of the present invention will now be described. The above-described embodiment is an example in which the present invention is applied to correction in the color temperature direction. However, the modification of the embodiment is an example in which the present invention is applied to correction in the chromaticity deviation direction. The chromaticity deviation direction is a deviation direction with respect to blackbody radiation when values based on the white balance output obtained by the R signal, the G signal, and the B signal based on the imaging signal and based on correction values specified by the user do not lie on the blackbody radiation.

In the correction along the chromaticity deviation direction, a first-order equation perpendicular to or having a predetermined gradient to the first-order equation of equation (7) in the above-described embodiment is provided. By using this first-order equation, correction along the chromaticity deviation direction can easily be performed similarly to the above-described correction along the color temperature direction.

In an example, it is considered to determine a first-order equation along the chromaticity deviation direction in a form perpendicular to a first-order equation obtained by blackbody radiation on a logR-logB plane in which the R signal and the B signal are represented by a logarithmic plane. That is, on the logR-logB plane shown in FIG. 16, when the straight line of the blackbody radiation is set as equation (7) described above, the straight line along the chromaticity deviation direction can be represented by the following equation (8):

$$R = -\frac{1}{c}(B - b) + r \quad (8)$$

Figure 19:
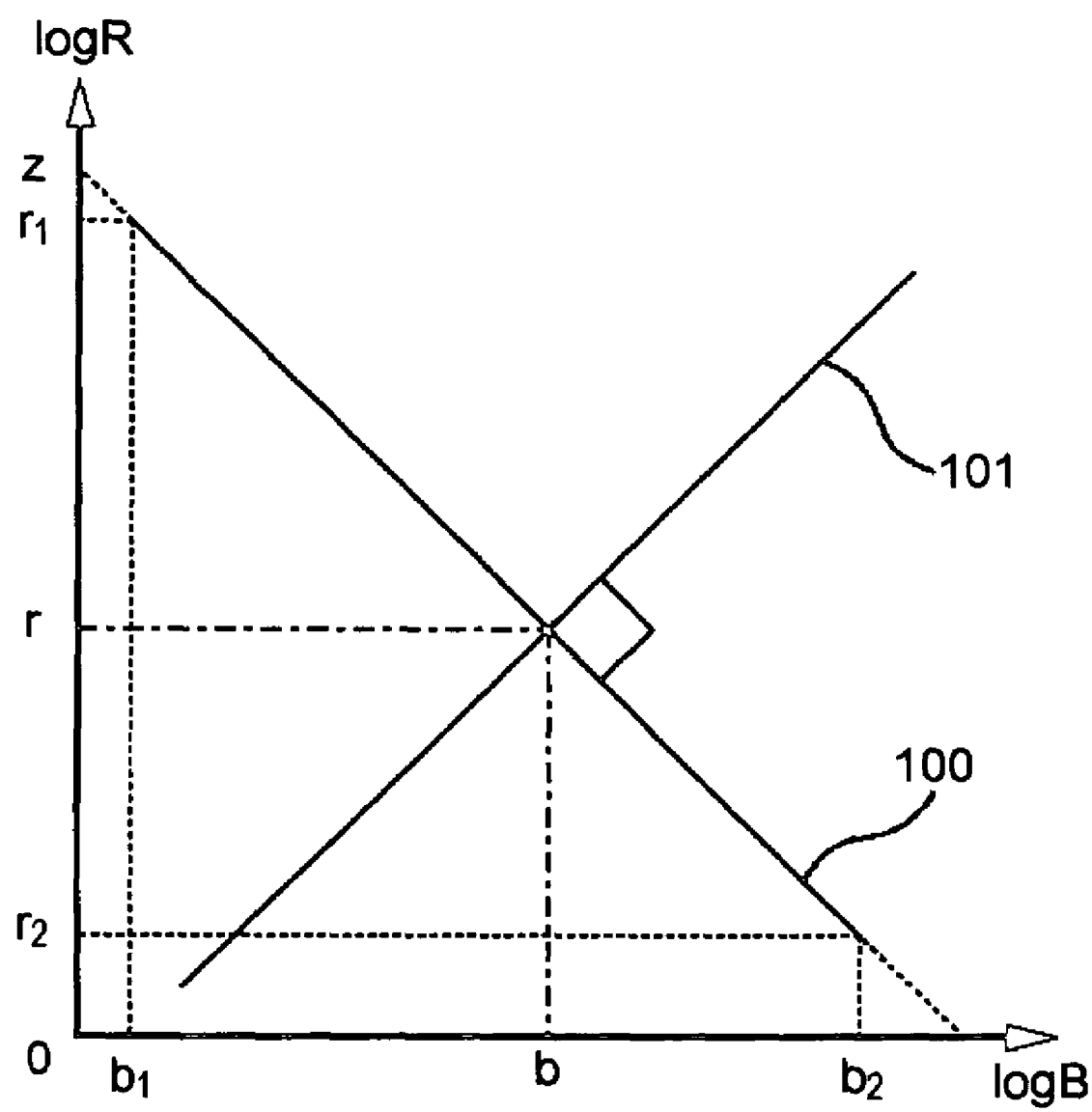
FIG. 19 is a schematic chart showing an example of a correction straight line in the chromaticity deviation direction on the logarithmic axis.
Figure 20:
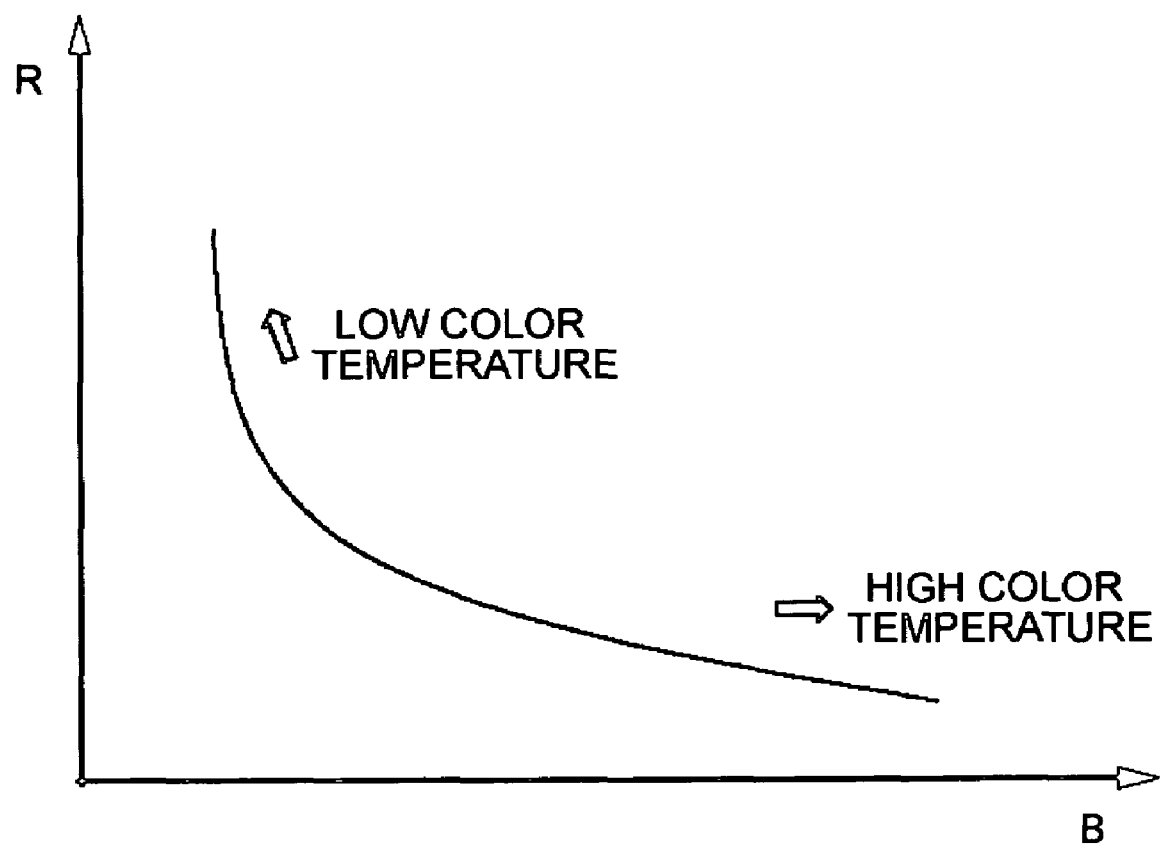
FIG. 20 is a schematic chart showing changes in color temperature due to black body radiation on the basis of the relationship between red color (R) and blue color (B), which are based on green color (G)
Figure 21:
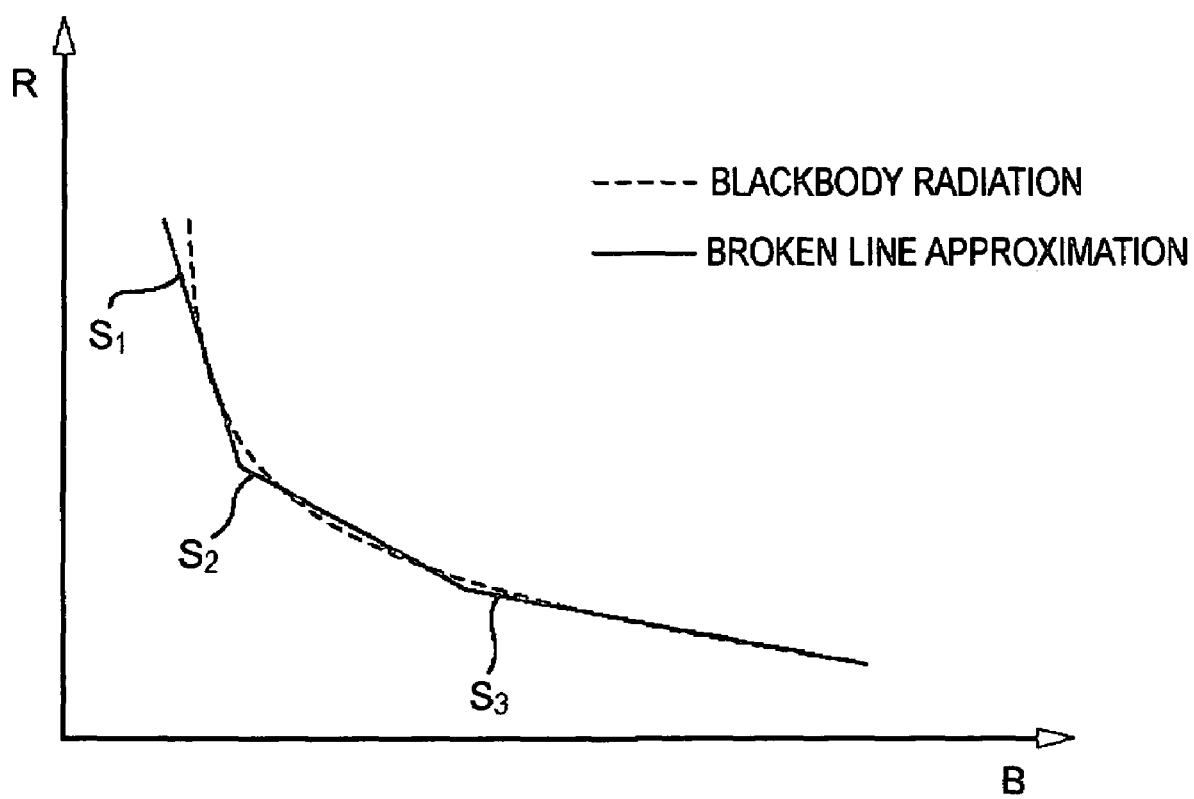
FIG. 21 is a schematic chart showing an example in which blackbody radiation is approximated with a plurality of linear straight lines.

FIG. 19 shows an example of a correction straight line along the chromaticity deviation direction on a logarithmic axis based on equation (8). A straight line 101 perpendicular to a straight line 100 by equation (7) becomes a correction straight line along the chromaticity deviation direction. By combining calculations of equation (7) and equation (8), it is possible to deal with white balance output correction in various cases.

That is, the straight line 101 moves on the straight line 100 of the blackbody radiation in response to the logR value or the logB value. Therefore, the straight line 101 is determined with respect to the white balance output that does not lie on the blackbody radiation or the like, and an intersection of the straight line 101 and the straight line 100 that is blackbody radiation is determined. This makes it possible to perform correction along the chromaticity deviation direction. Furthermore, when a correction value is specified by the user, on the basis of the straight line 100, white balance output after correction can be determined in accordance with processing of the flowchart shown in FIG. 17.

In the related art, when correction along the chromaticity deviation direction is to be performed, it is necessary to have a table for correlation color temperatures, and values that do not exist in the table need to be determined by performing interpolation from the values obtained by referring to the table. According to the modification of the embodiment of the present invention, it is possible to easily and simply perform correction along the chromaticity deviation direction using a first-order equation. There is no need to have a table having a large data size and also, an interpolation process is not necessary.

As described above, according to the embodiment of the present invention and the modification of the embodiment, the relationship between color temperature information and chromaticity deviation information; and the R signal and the B signal can be represented using a simple first-order equation, and becomes very clear. Therefore, the present invention can be applied to not only a case in which a correction value for the preset white balance output is input, but also to a case in which the color temperature is to be corrected under all conditions such as a case in which white balance output is determined by directly specifying a color temperature.

In the embodiment of the present invention and the modification of the embodiment, correction along the color temperature direction and correction along the chromaticity deviation direction are performed only by the computation process in the CPU 16 incorporated in the imaging apparatus 1. Therefore, costs in terms of hardware do not occur. Furthermore, calculations are possible more easily than the computations with a color temperature, an R signal, and a B signal using nonlinear equations, which have been performed before. As a consequence, the processing by the CPU 16 can be expected to be performed at a higher speed, and thus, the image-capturing time of the imaging apparatus 1 can be shortened.

In the foregoing, a white balance process and a white balance correction process are performed using the R signal and the B signal, which are based on the G signal. The present invention is not limited to this example, and these processes can also be performed by combining, for example, the G signal and the R signal or by combining the G signal and the B signal.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing method, comprising using a processor to perform the operation of:
   changing white balance in a color temperature direction by using values such that each of first and second color signals is converted into a logarithm, wherein the white balance is changed in a chromaticity deviation direction by using a straight line perpendicular to blackbody radiation that is made linear by converting each of the first and second color signals into a logarithm.

2. The image processing method according to claim 1, wherein the step of changing the white balance in the color temperature direction includes:
   calculating a value of the first color signal using a first first-order equation that indicates a relationship between a value indicating the amount of change in the color temperature direction and the value of the first color signal;
   calculating a value of the second color signal using a second first-order equation that indicates a relationship between the value of the second color signal and the value of the first color signal determined by the first first-order equation calculation; and
   determining an output of the changed white balance based on the value of the first color signal determined in the first first-order equation calculation and the value of the second color signal determined in the second first-order equation calculation.

3. An imaging apparatus, comprising:
   an imaging section configured to capture light from a subject and output an image signal;
   a white balance adjustment section configured to adjust white balance based on the image signal output from the imaging section;
   a color temperature change instruction section configured to provide instructions for changing the adjusted white balance in a color temperature direction; and
   a color temperature change section configured to change, in response to instructions from the color temperature change instruction section, the white balance in the color temperature direction by using values such that each of first and second color signals, which are based on the image signal output from the imaging section, is converted into a logarithm,
   wherein the color temperature change section changes the white balance in a chromaticity deviation direction by using a straight line perpendicular to blackbody radiation that is made linear by converting each of the first and second color signals into a logarithm.

4. The imaging apparatus according to claim 3, wherein the changing of the white balance in the color temperature direction by the color temperature change section is performed in such a manner that a value of the first color signal is calculated using a first first-order equation indicating a relationship between a value indicating the amount of change in the color temperature direction and the value of the first color signal, a value of the second color signal is calculated using a second first-order equation indicating the relationship between the value of the second color signal and the value of the first color signal determined using the first first-order equation, and an output of the changed white balance is determined based on the value of the first color signal determined from the first first-order equation and the value of the second color signal determined from the second first-order equation.

* * * * *